US010603581B2

(12) United States Patent
Tsuda et al.

(10) Patent No.: US 10,603,581 B2
(45) Date of Patent: Mar. 31, 2020

(54) INFORMATION PROCESSING DEVICE AND INFORMATION PROCESSING METHOD

(71) Applicant: SONY CORPORATION, Tokyo (JP)

(72) Inventors: Taro Tsuda, Tokyo (JP); Daisuke Shiigi, Kanagawa (JP); Yoshinobu Ito, Kanagawa (JP); Tsutomu Nakatsuru, Tokyo (JP); Kotaro Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 15/759,433

(22) PCT Filed: Sep. 16, 2016

(86) PCT No.: PCT/JP2016/077551
§ 371 (c)(1),
(2) Date: Mar. 12, 2018

(87) PCT Pub. No.: WO2017/051782
PCT Pub. Date: Mar. 30, 2017

(65) Prior Publication Data
US 2018/0256971 A1 Sep. 13, 2018

(30) Foreign Application Priority Data
Sep. 25, 2015 (JP) ................ 2015-188072

(51) Int. Cl.
*A63F 13/21* (2014.01)
*A63F 13/235* (2014.01)
(Continued)

(52) U.S. Cl.
CPC ............ *A63F 13/235* (2014.09); *A63F 13/21* (2014.09); *A63F 13/213* (2014.09); *G06F 3/041* (2013.01);
(Continued)

(58) Field of Classification Search
CPC ......... A63F 13/21; A63F 13/24; A63F 13/323
See application file for complete search history.

(56) References Cited

U.S. PATENT DOCUMENTS

2001/0035815 A1 11/2001 Fletcher et al.
2004/0214642 A1* 10/2004 Beck ..................... A63F 13/327
463/40
(Continued)

FOREIGN PATENT DOCUMENTS

EP 2503487 A2 9/2012
EP 2752227 A1 7/2014
(Continued)

OTHER PUBLICATIONS

Apr. 8, 2019, European Search Report issued for related EP Application No. 16848570.4.

*Primary Examiner* — Omkar A Deodhar
(74) *Attorney, Agent, or Firm* — Paratus Law Group, PLLC

(57) ABSTRACT

There is provided an information processing device to detect the position of the RFID tag performing wireless communication with a high degree of accuracy and perform display according to the position of the RFID tag, the information processing device including: a first information acquiring unit configured to acquire identification information of an RFID tag on a basis of communication with the RFID tag according to near field wireless communication; and a second information acquiring unit configured to acquire position information of the RFID tag in a method different from a method used by the first information acquiring unit. The position information is transmitted to an external device.

22 Claims, 28 Drawing Sheets

(51) Int. Cl.
*G06F 3/0488* (2013.01)
*G06F 3/046* (2006.01)
*G06K 7/10* (2006.01)
*A63F 13/213* (2014.01)
*G06F 3/041* (2006.01)
*G06K 19/07* (2006.01)
*A63F 13/2145* (2014.01)
*A63F 13/323* (2014.01)
*A63F 13/24* (2014.01)

(52) U.S. Cl.
CPC ............ *G06F 3/046* (2013.01); *G06F 3/0488* (2013.01); *G06K 7/10* (2013.01); *G06K 19/0723* (2013.01); *A63F 13/2145* (2014.09); *A63F 13/24* (2014.09); *A63F 13/323* (2014.09)

(56) References Cited

U.S. PATENT DOCUMENTS

| | | |
|---|---|---|
| 2014/0333025 A1 | 11/2014 | Amireh et al. |
| 2015/0009190 A1* | 1/2015 | Kuwahara ............ G09G 3/2092 345/205 |
| 2015/0217190 A1 | 8/2015 | Coyne |
| 2015/0242018 A1* | 8/2015 | Shi ......................... G06F 3/044 345/174 |

FOREIGN PATENT DOCUMENTS

| | | |
|---|---|---|
| JP | 2008-110206 A | 5/2008 |
| WO | WO 2009/149112 A1 | 12/2009 |
| WO | WO 2014/136167 A1 | 9/2014 |

* cited by examiner

FIG. 5
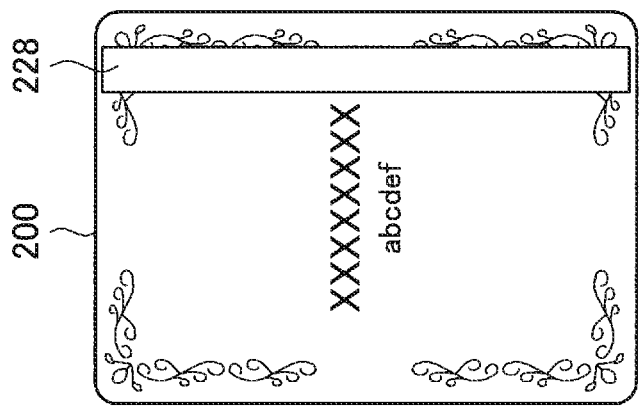
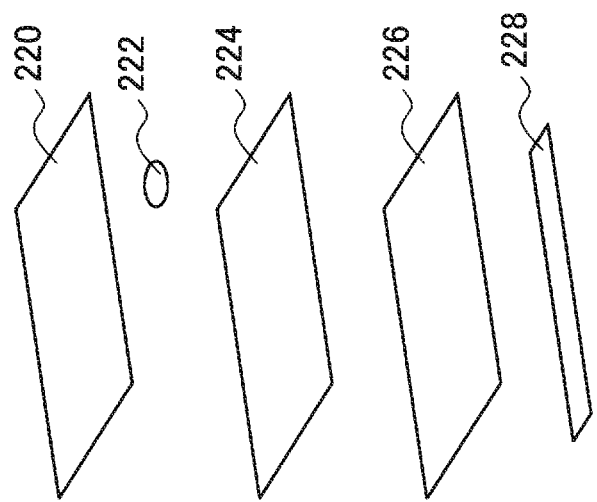

FIG. 23
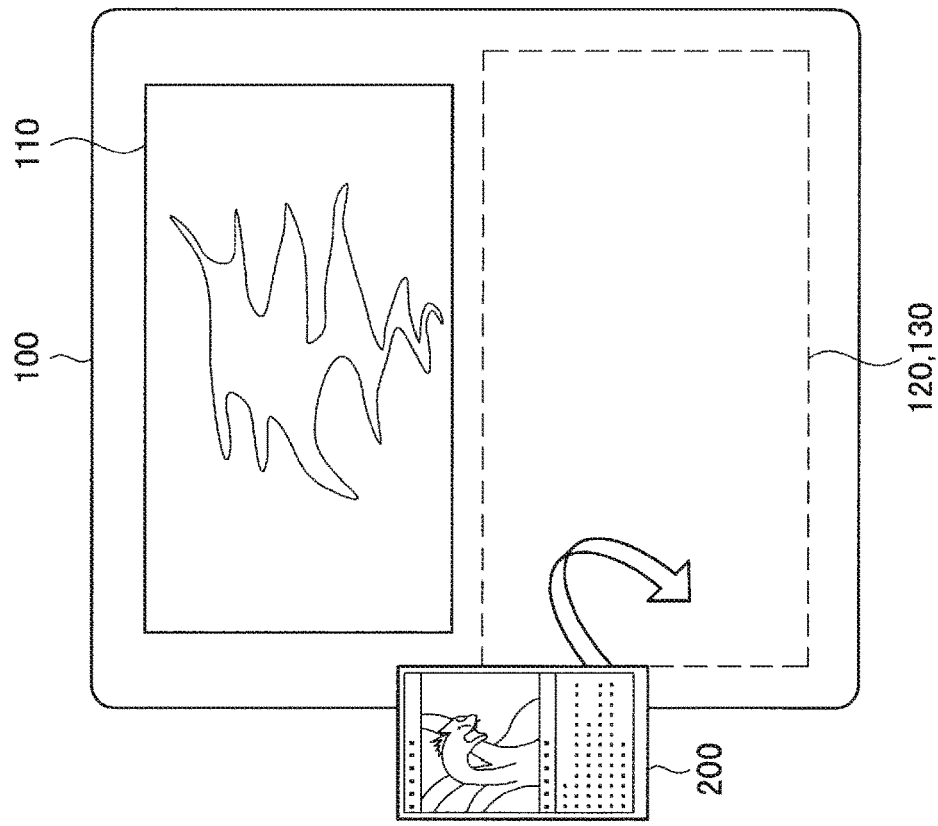
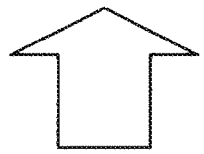
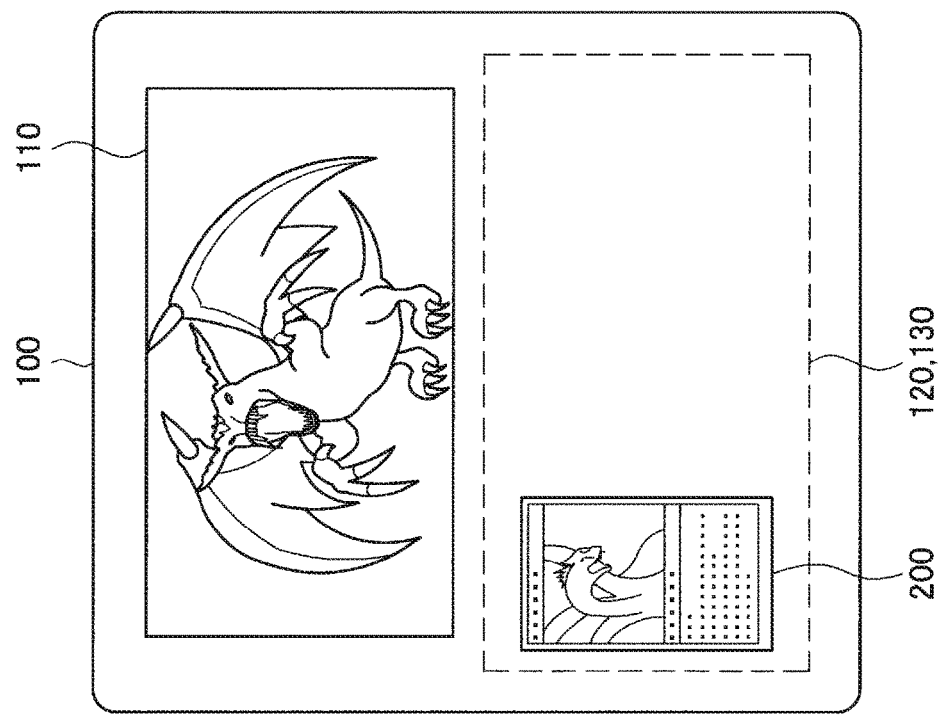

FIG. 24
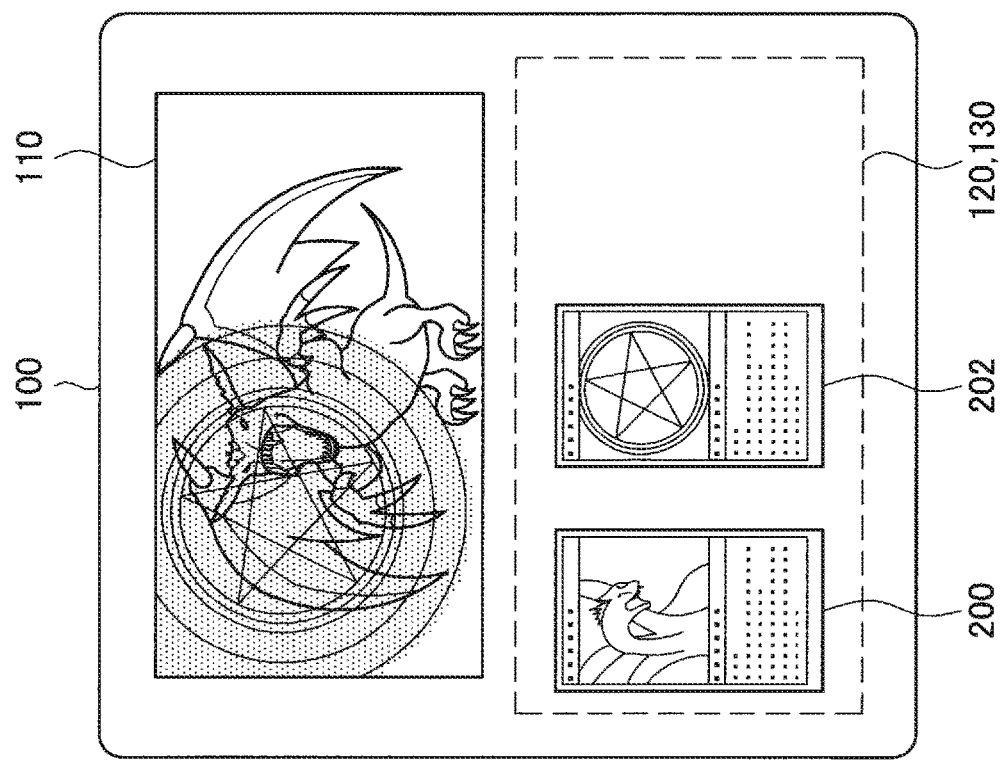
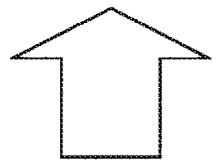
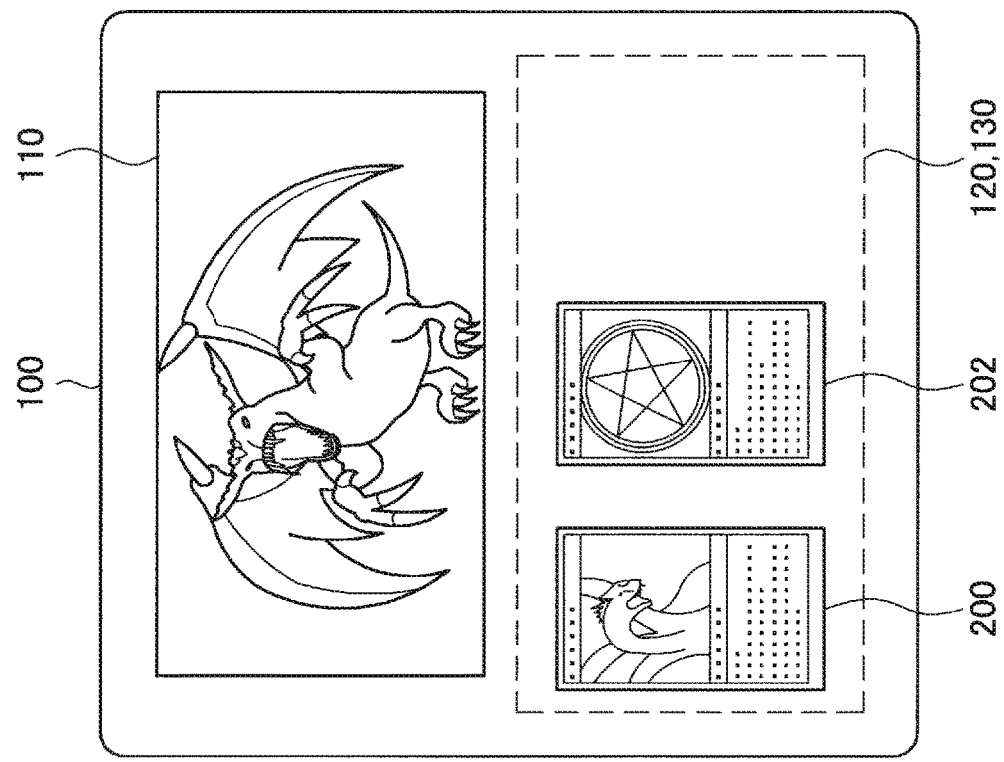

FIG. 25
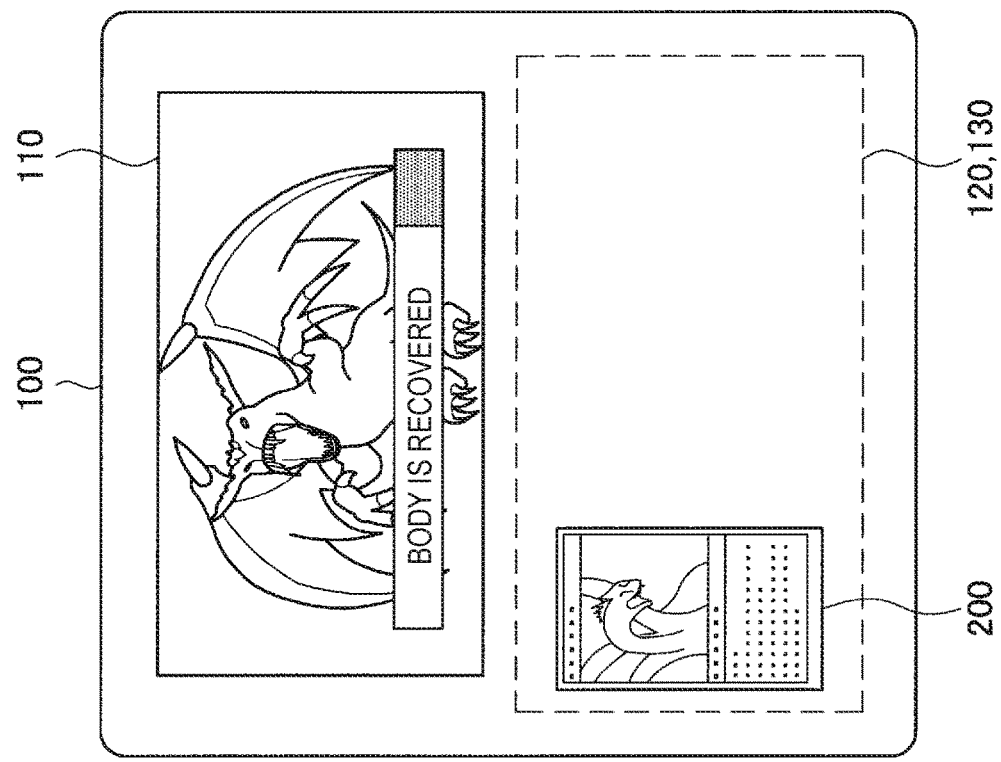
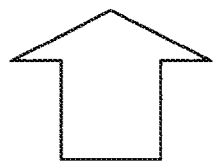
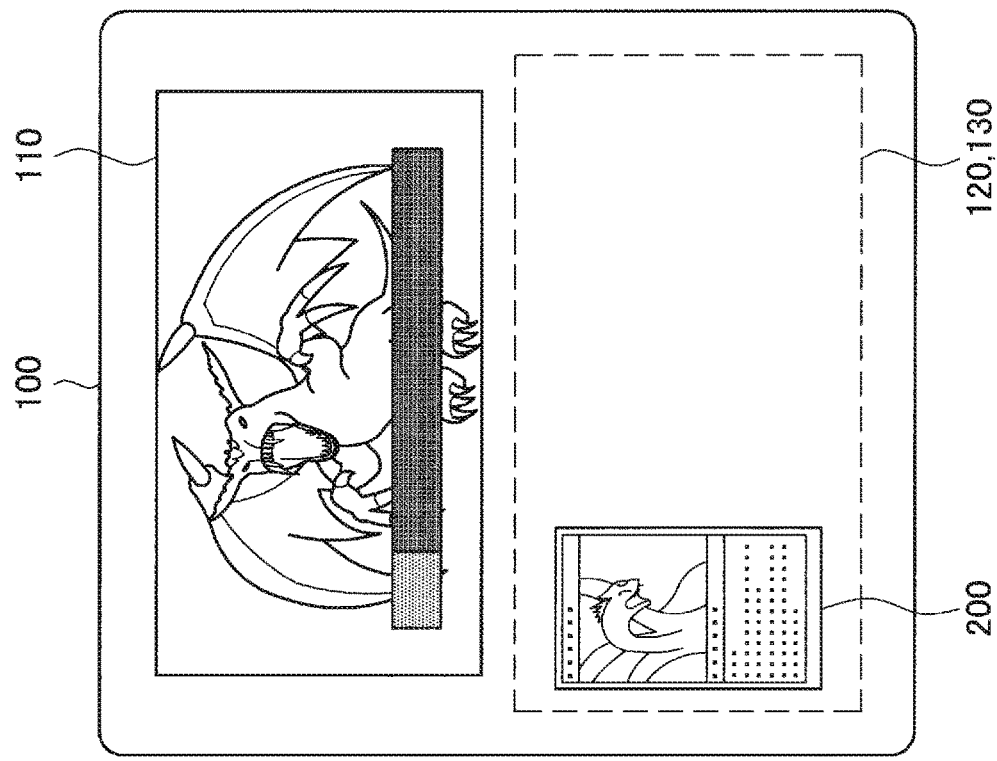

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2016/077551 (filed on Sep. 16, 2016) under 35 U.S.C. § 371, which claims priority to Japanese Patent Application No. 2015-188072 (filed on Sep. 25, 2015), which are all hereby incorporated by reference in their entirety.

TECHNICAL FIELD

The present disclosure relates to an information processing device and an information processing method.

BACKGROUND ART

In the past, a technique in which, in an RFID tag reader for near field wireless communication, a plurality of antennas for transmitting and receiving data are spread and arranged within a predetermined range, and one antenna to be used for transmission and reception of data is selected from among a plurality of antennas has been known for example, as disclosed in Patent Literature 1 below.

CITATION LIST

Patent Literature

Patent Literature: WO 2014/136167

DISCLOSURE OF INVENTION

Technical Problem

According to the technique disclosed in the Patent Literature 1, a position of the RFID tag can be detected by specifying one antenna to be used for transmission and reception of data from among a plurality of antennas. However, in a method in which a plurality of antennas are disposed, it is difficult to detect the position of the RFID tag with a high degree of accuracy.

In this regard, there is a demand for a technique of detecting the position of the RFID tag performing wireless communication with a high degree of accuracy and performing display according to the position of the RFID tag.

Solution to Problem

According to the present disclosure, there is provided an information processing device including: a first information acquiring unit configured to acquire identification information of an RFID tag on a basis of communication with the RFID tag according to near field wireless communication; a second information acquiring unit configured to acquire position information of the RFID tag in a method different from a method used by the first information acquiring unit, and a transmitting unit configured to transmit the position information. The first information acquiring unit may acquire the position information of the RFID tag on a basis of the communication with the RFID tag according to the near field wireless communication. In addition, the information processing device may include a display processing unit configured to perform a display process of performing display on a display unit on a basis of the position information of the RFID tag acquired by the first information acquiring unit and the second information acquiring unit.

The first information acquiring unit may acquire the position information of the RFID tag on a basis of information acquired from a plurality of readers/writers performing the near field wireless communication with the RFID tag.

In addition, the second information acquiring unit may acquire the position information of the RFID tag on a basis of information acquired from a capacitance sensor configured to detect a position of the RFID tag.

In addition, the second information acquiring unit may acquire the position information of the RFID tag on a basis of information acquired from an optical sensor that detects a position of the RFID tag.

In addition, the display processing unit may perform a display process of performing display on a display unit on a basis of the identification information.

In addition, the information processing device may include a command execution processing unit configured to execute a process of a command corresponding to the position information on a basis of the position information acquired by the first information acquiring unit or the second information acquiring unit.

In addition, the information processing device may include a display processing unit configured to perform a display process of performing display on a display unit on a basis of the position information of the RFID tag acquired by the first information acquiring unit and the second information acquiring unit, and the display processing unit may perform a display process according to the execution of the process of the command.

In addition, in a case in which there are a plurality of RFID tags, the command execution processing unit may execute a process of a command corresponding to the plurality of RFID tags on a basis of the position information acquired by the first information acquiring unit or the second information acquiring unit.

In addition, in a case in which a plurality of RFID tags are stacked, the command execution processing unit may execute a process of a command corresponding to the stacking on a basis of the position information acquired by the first information acquiring unit or the second information acquiring unit.

In addition, the command execution processing unit may execute a process of a command corresponding to position information indicating a distance to the RFID tag acquired by the second information acquiring unit on a basis of the position information.

In addition, the information processing device may include a command execution processing unit configured to execute a process of a command corresponding to the identification information.

In addition, the information processing device may further include a rewrite information generating unit configured to generate rewrite information for rewriting information held in the RFID tag in response to the execution of the command by the command execution processing unit.

In addition, the information processing device may include a transmitting unit configured to transmit the rewrite information to the RFID tag.

In addition, the first information acquiring unit may acquire position information of a finger of a user on a basis of the communication with the RFID tag according to the near field wireless communication, and the display processing unit may perform a display process of performing display on the display unit on a basis of the position information of the RFID tag acquired by the first information acquiring unit and the second information acquiring unit and the position information of the finger of the user.

In addition, the information processing device may include a receiving unit configured to receive manipulation information of a manipulating unit installed in the RFID tag, and the command execution processing unit may execute a process of a command corresponding to the manipulation information.

In addition, the information processing device may include a reader/writer pad that includes the plurality of reader/writers arranged in a matrix form.

In addition, the RFID tag may have a card shape, and the first information acquiring unit may acquire the position information of the RFID tag according to a motion of the RFID tag on the reader/writer pad.

In addition, the first information acquiring unit may acquire the position information of the RFID tag on a basis of information acquired from a plurality of readers/writers configured to perform the near field wireless communication with the RFID tag on a basis of the communication with the RFID tag according to the near field wireless communication, the information processing device may include a reader/writer pad including the plurality of reader/writers arranged in matrix form, and the capacitance sensor may be arranged such that the capacitance sensor is superimposed on the reader/writer pad.

In addition, the first information acquiring unit may acquire the position information of the RFID tag on a basis of information acquired from a plurality of readers/writers configured to perform the near field wireless communication with the RFID tag on a basis of the communication with the RFID tag according to the near field wireless communication, the information processing device may include a reader/writer pad including the plurality of reader/writers arranged in matrix form, and the optical sensor may be arranged such that the optical sensor is superimposed on the reader/writer pad.

In addition, the identification information acquired by the first information acquiring unit may be transmitted to the external device.

In addition, the second information acquiring unit may detect a direction of the RFID tag in addition to the position information and transmits the direction of the RFID tag to the external device together with the position information.

In addition, the second information acquiring unit may detect a motion of the RFID tag in addition to the position information and transmits the motion of the RFID tag to the external device together with the position information.

In addition, according to the present disclosure, there is provided an information processing method including: acquiring identification information of an RFID tag on a basis of communication with the RFID tag according to near field wireless communication; acquiring position information of the RFID tag in a method different from a method used by the first information acquiring unit; and transmitting the position information.

Advantageous Effects of Invention

As described above, according to the present disclosure, it is possible to detect a position of an information recording medium performing wireless communication with a high degree of accuracy and performing display according to the position of the information recording medium. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a schematic diagram illustrating a configuration of a card.

FIG. 23 is a schematic diagram for describing game play performed by an information processing device.

FIG. 24 is a schematic diagram for describing game play performed by an information processing device.

FIG. 25 is a schematic diagram for describing game play performed by an information processing device.

MODE(S) FOR CARRYING OUT THE INVENTION

Figure 1:
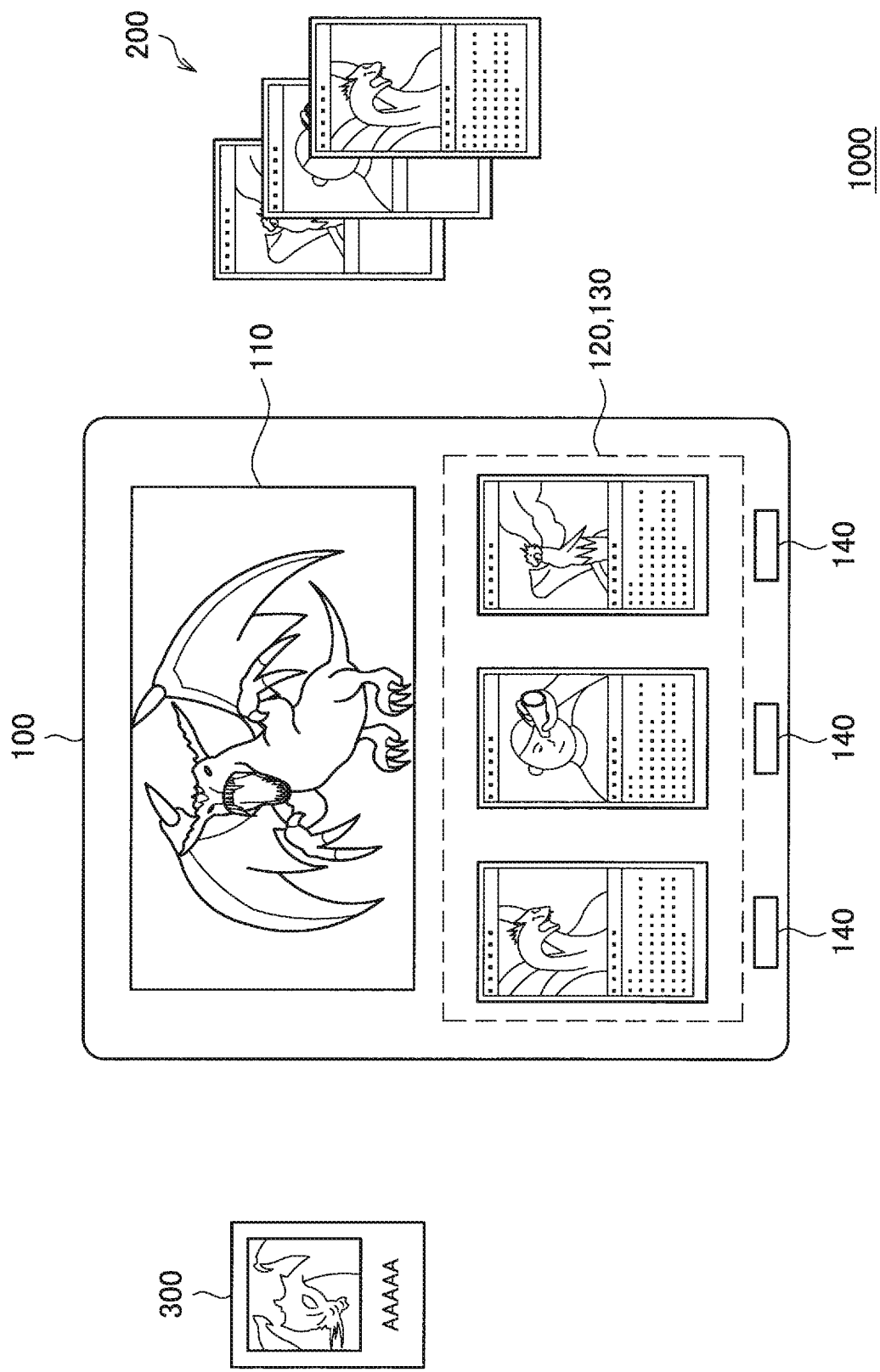
FIG. 1 is a schematic diagram illustrating a configuration of an information processing system according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. External configuration of information processing system
2. Physical configurations of information processing device and card
3. Functional block configuration of information processing device
4. Play content of game 1. External Configuration of Information Processing System First, a configuration of an information processing system 1000 according to the present disclosure will be described with reference to FIG. 1. The information processing system 1000 according to the present embodiment includes an information processing device 100 and a card 200 (a RFID tag) for near field wireless communication. The information processing device 100 is configured as, for example, a portable game machine. A user can play a game by loading game software 300 onto the information processing device 100.

FIG. 1 illustrates an external appearance of the information processing device 100. The information processing device 100 includes a display unit 110, a reader/writer pad (hereinafter referred to as a R/W pad") 120, a touch pad (touch sensor) 130, and a manipulation button 140. The information processing device 100 is configured in a tablet form and has a size of, for example, about 20 cm×20 cm. The display unit 110 includes, for example, a 5-inch liquid crystal display. In the present embodiment, the R/W pad 120 is configured such that a plurality of readers/writers (hereinafter referred to as "R/Ws") 122 are arranged in a planar manner. For example, about 10 to 20 R/Ws 122 are arranged.

The information processing device 100 generates a carrier wave in accordance with a communication standard of near field communication (NFC) and performs communication with the card 200. To this end, the R/W 122 and the card 200 perform transmission and reception of a carrier wave of a frequency (13.56 MHz) conforming to the communication standard of NFC using electromagnetic induction. On the other hand, the information processing device 100 and the card 200 may communicate with each other in accordance with another communication standard different from NFC.

As described above, each of a plurality of R/Ws 122 communicating with the card 200 can generate a carrier wave in accordance with the communication standard of NFC and communicate with the card 200. A plurality of R/Ws 122 are arranged in a matrix form, and coordinates in a region of the R/W pad 120 are decided in advance. Therefore, the information processing device 100 can detect a position of the card 200 on the basis of a position of each R/W 122 performing communication with the card 200.

Further, the information processing device 100 can detect the position of the card 200 through the touch pad 130. The information processing device 100 can also detect a manipulation performed by a finger of the user through the touch pad 130.

The position detection of the card 200 using the R/W 122 and the position detection of the card 200 using the touch pad 130 may have different roles. As an example, a rough position of the card 200 is detected in the position detection of the card 200 using the R/W 122, and a finer position detection of the card 200 is performed in the position detection of the card 200 using the touch pad 130. Accordingly, the information processing device 100 can detect a position, a direction, a motion, or the like of the card 200 and receive a command input by the user in accordance with the motion of the card 200. In a case in which the position detection is performed using only the touch pad 130, only the position of card 200 can be determined, but in a case in which the R/W pad 120 is used together, it is possible to execute a command in accordance with a character.

2. Physical Configuration of Information Processing Device and Card

Figure 2:
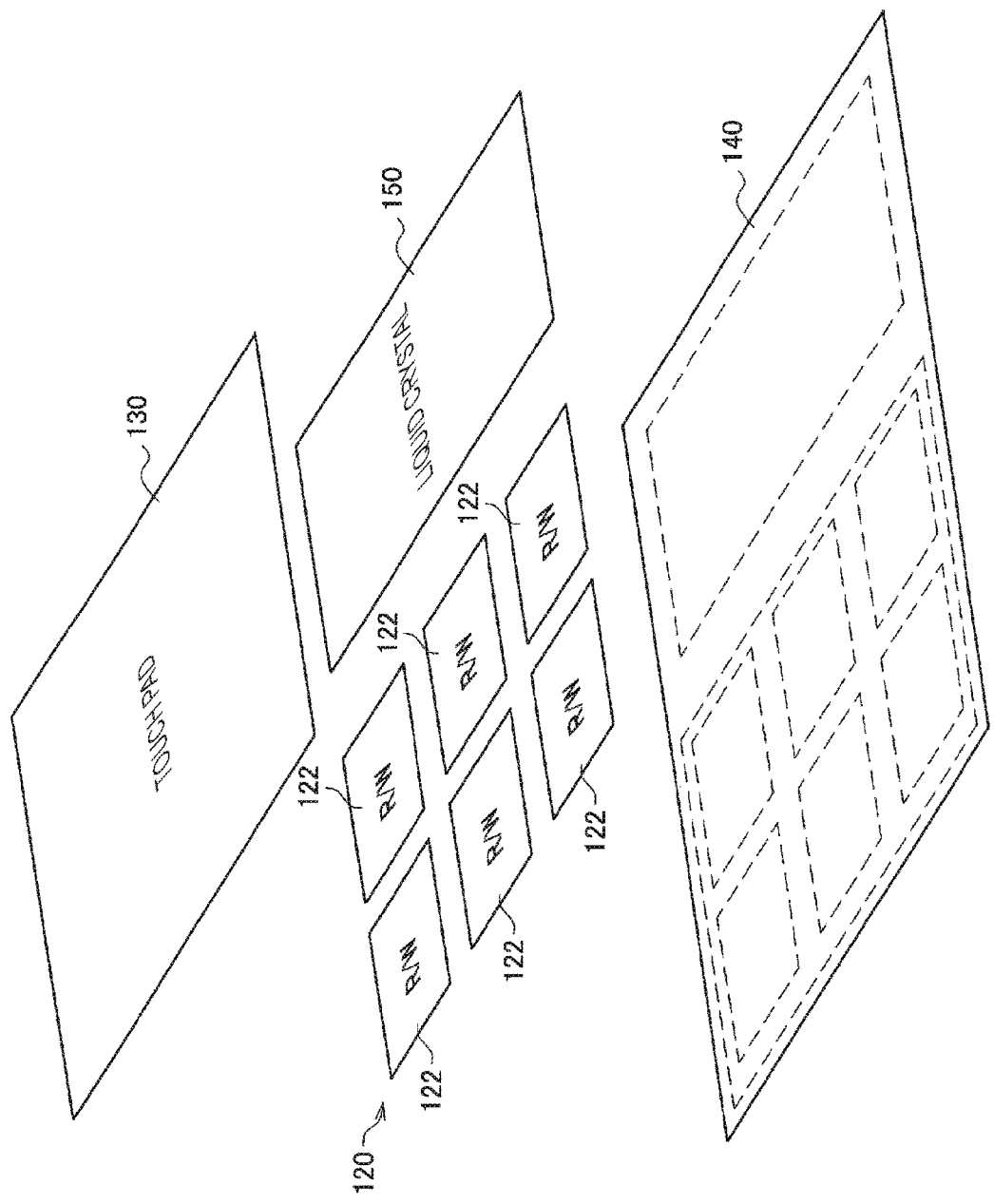
FIG. 2 is a schematic diagram illustrating a physical configuration of an information processing device.

FIG. 2 is a schematic diagram illustrating a physical configuration of the information processing device 100. As illustrated in FIG. 2, a liquid crystal panel 150 constituting a display unit 110 and a plurality of R/Ws 122 are arranged on a substrate 140. Further, the R/W pad 120 is constituted by a plurality of R/Ws 122, and the touch pad 130 is superimposed on a plurality of R/Ws 122. The touch pad 130 may be superimposed on the liquid crystal panel 150. In this case, the touch pad 130 and the liquid crystal panel 150 are superimposed to constitute a touch panel. The touch pad 130 includes a capacitance sensor as an example.

Recognition of identification information (an ID, a type of character, and the like) stored in the card 200, rewriting of information stored in the card 200, and detection of a position, a direction, and a motion of the card 200 are performed through a plurality of R/Ws 120. Further, a finer position, direction, and motion of the card 200 are detected through the touch pad 130, The display unit 110 performs display based on information read from the card 200 and performs display according to a position, a direction, or a motion of the card 200. As described above, in the present embodiment, the identification information stored in the card 200 is detected by the R/W 120, and a fine position, direction, and motion of the card 200 are detected by the touch pad 130. Further, in the present embodiment, the position, the direction, and the motion of the card 200 can be detected by the R/W 120.

Figure 3:
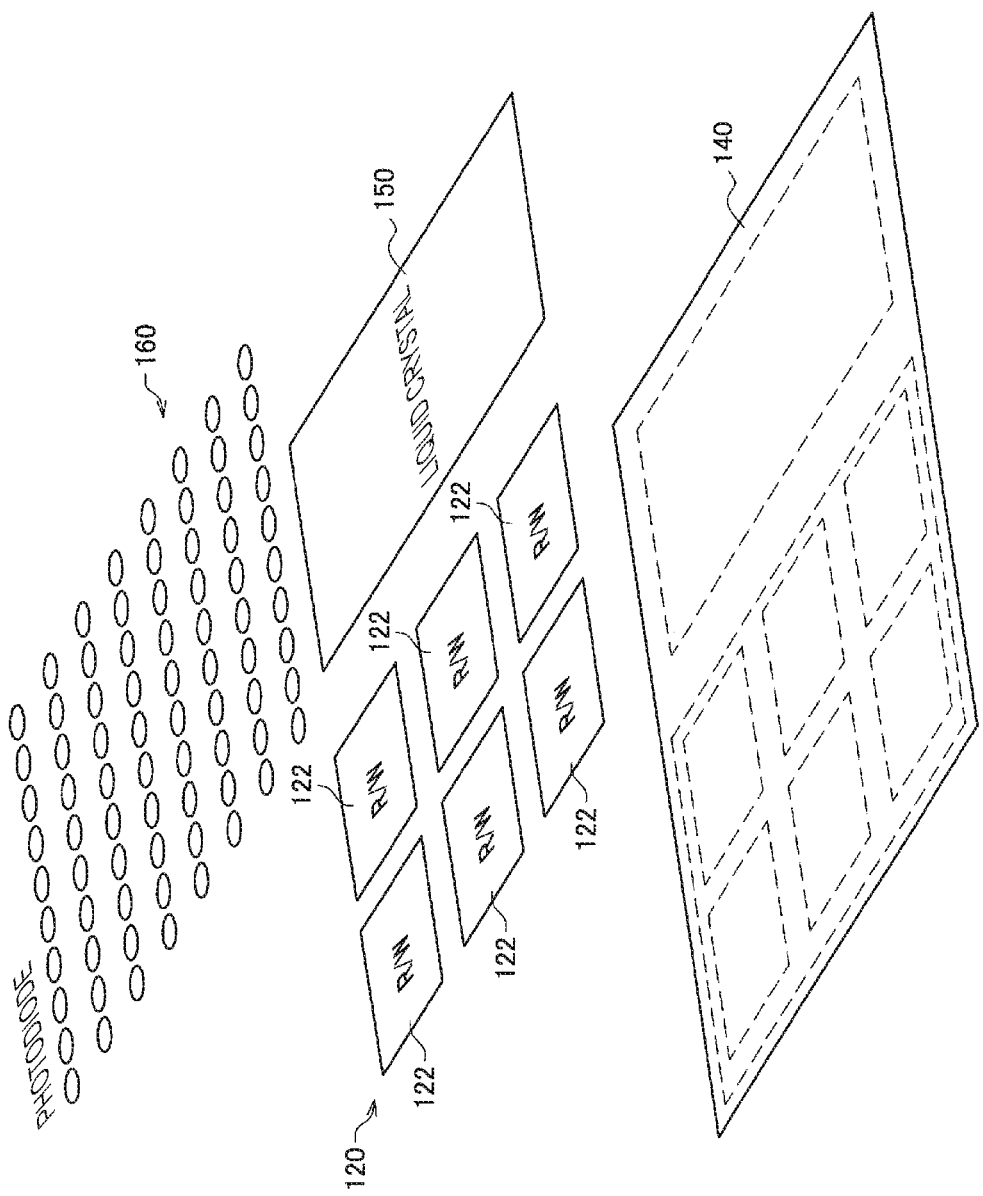
FIG. 3 is a schematic diagram illustrating another physical configuration of an information processing device.

FIG. 3 is a schematic diagram illustrating another physical configuration of the information processing device 100. In the example illustrated in FIG. 3, a plurality of photodiodes 160 are arranged instead of the touch pad 130 as compared with the example illustrated in FIG. 2. Each of a plurality of photodiodes 160 can detect (a contour of) the card 200 placed on the surface of the information processing device 100 using light detection. Therefore, even in the example illustrated in FIG. 3, it is possible to detect a fine position, direction, motion, and the like of the card 200 using a plurality of photodiodes 160. Further, as a method of detecting the card 200 other than the R/W pad 120, position detection using magnetic field detection or position detection using a laser may be used. In the case of the magnetic field detection, for example, Hall elements or coils are placed on the information processing device 100 side to detect a voltage. Further, the position of the card 200 can be detected using a sound, or the position of the card 200 can be detected by photographing the card 200 with a camera from the top of the information processing device 100.

Figure 4:
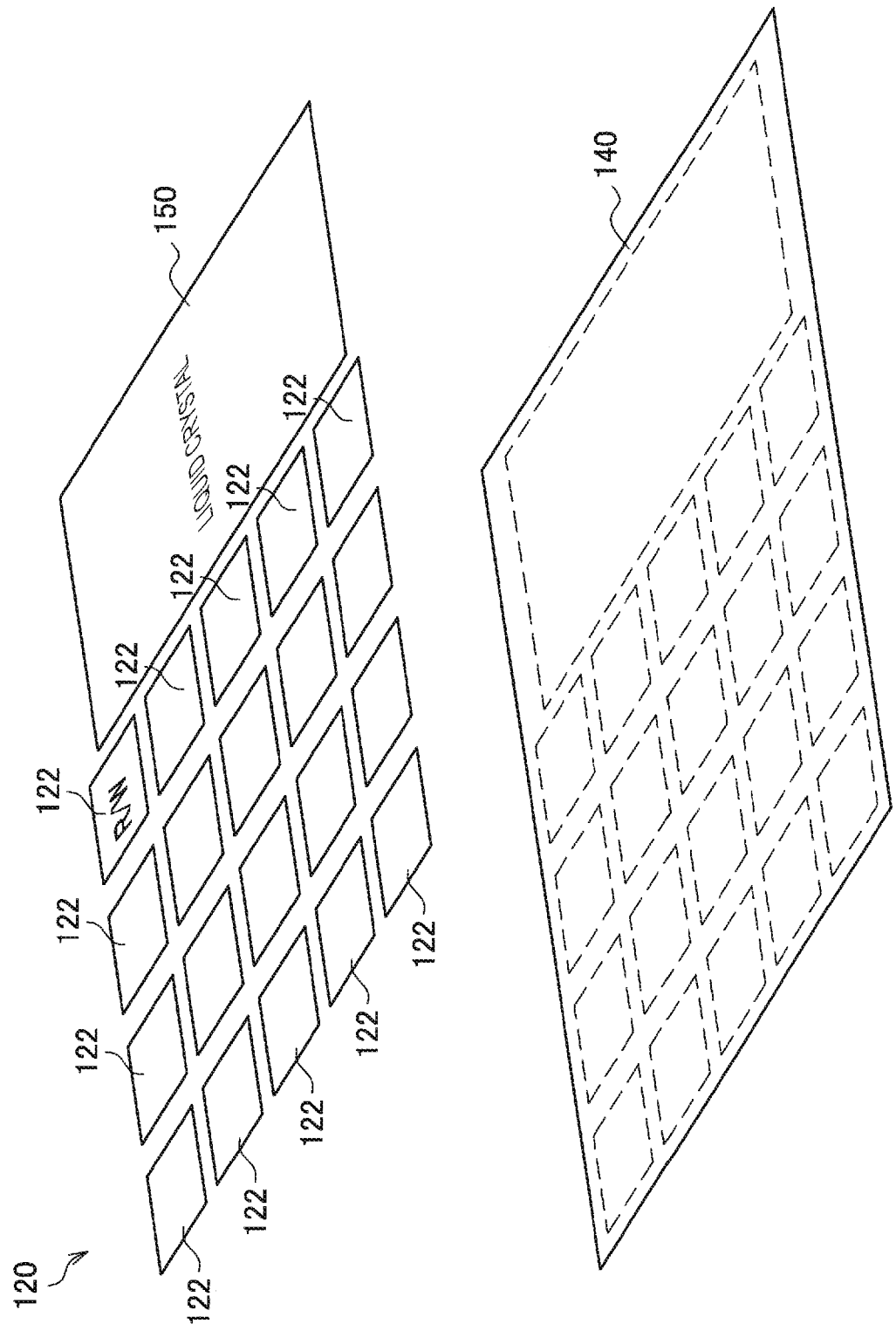
FIG. 4 is a schematic diagram illustrating an example in which an R/W pad is constituted by more R/Ws than in FIG. 2.

FIG. 4 illustrates an example in which the R/W pad 120 is constituted by more R/Ws 122 than in FIG. 2. Since the R/Ws 122 are arranged at many points in this way, it is possible to detect a fine position, direction, and motion of the card 200. Therefore, in the example illustrated in FIG. 4, the touch pad 130 and the photodiode 160 are unnecessary.

FIG. 5 is a schematic diagram illustrating a configuration of the card 200, and a right diagram illustrates a configuration example in which a capacity is given by attaching a metallic plate 228 to the card 200 so that the touch pad 130 can easily detect the position of the card 200. Further, as illustrated in a left diagram of FIG. 5, the card 200 includes a top surface plate 220, an IC chip 222, an antenna module 224, a back surface plate 226, and the metallic plate 228. The metallic plate 228 is attached to the outer surface of the card 200. The IC chip 222 is a chip that communicates with each of the R/Ws 122 of the information processing device 100 in accordance with the communication standard of NFC. According to the configuration illustrated in FIG. 5, since the capacity of the card 200 can be increased by the metallic plate 228, the detection of the card 200 performed by the touch pad 130 can be reliably performed. In the card 200 according to the present embodiment, when the user moves the card 200 above the R/W pad 120, the position of the card 200 is detected on the information processing device 100 side, and a command corresponding to the motion is given to the information processing device 100.

3. Function Block Configuration of Information Processing Device

Figure 6:
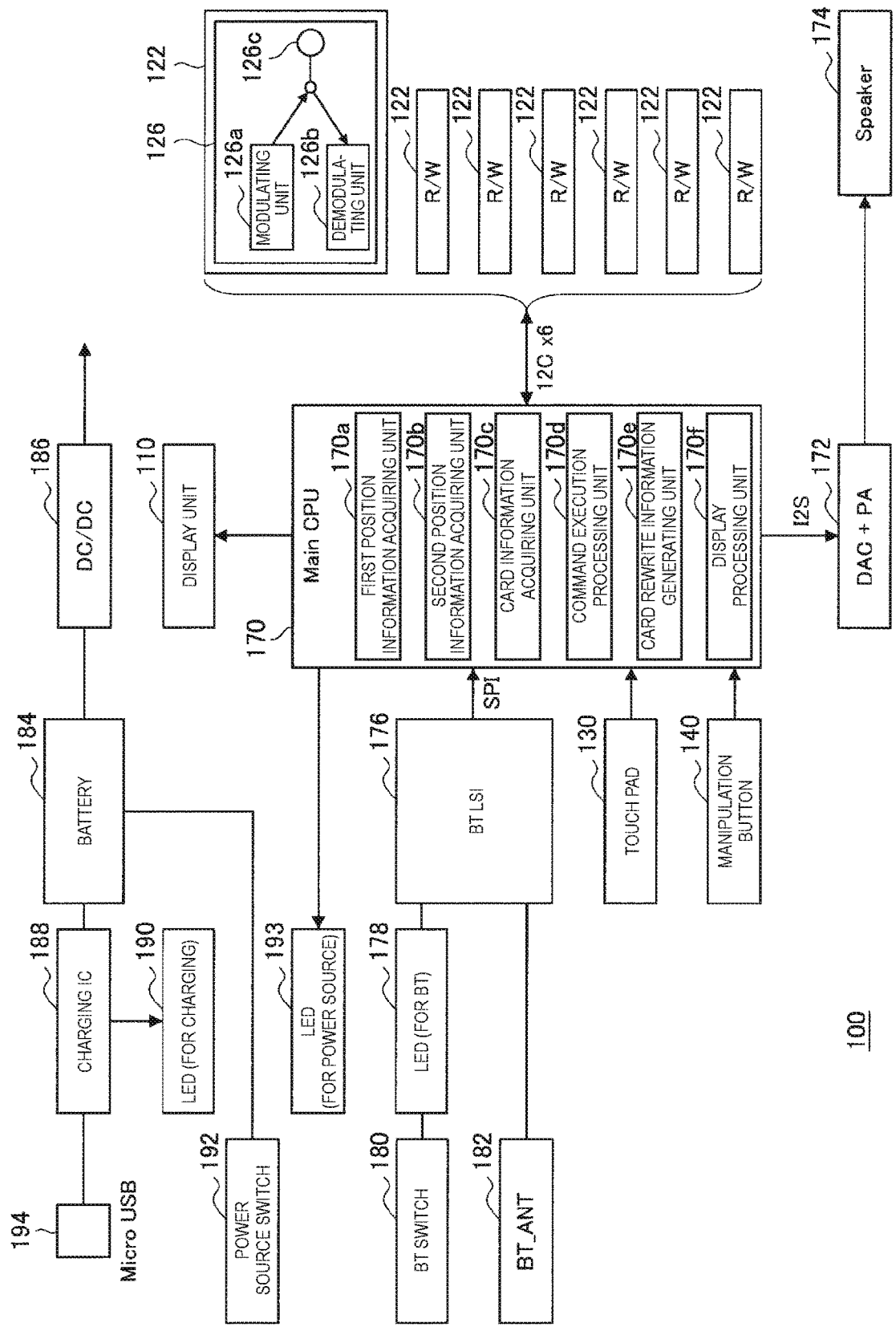
FIG. 6 is a schematic diagram illustrating a configuration of functional blocks of an information processing device.

FIG. 6 is a schematic diagram illustrating a configuration of functional blocks of the information processing device 100. As illustrated in FIG. 6, the information processing device 100 includes the display unit 110, a plurality of R/Ws 122, the touch pad 130, the manipulation button 140, a control unit (CPU) 170, a DAC+PA 172, a speaker 174, a Bluetooth (BT) (a registered trademark) LSI 176, a BT LED 178, a BT switch 180, a BT_ANT 182, a battery 184, a DC/DC converter 186, a charging IC 188, a charging LED 190, a power source switch 192, a power source LED 193, and a micro USB 194 (externally attached). Further, here, the touch pad 13 has been described as an example, but the present disclosure is not limited to this example. For example, a configuration in which a pattern for capacitance sensing is drawn on a substrate, and position detection is performed through a combination with a sensor IC may be provided. In this case, the position of the card 200 can be detected by giving the capacity by other techniques such as using aluminum as a material of the card 200, performing printing on the card 200, or installing an antenna on the card 200.

The control unit 170 is implemented using a known microcomputer and processes data to be transmitted to the card 200 and data received from the card 200.

Each of the R/W 122 includes a transceiving unit 126. The transceiving unit 126 performs transmission and reception of information with the card 200. To this end, the transceiving unit 126 includes a modulating unit 126a, a demodulating unit 126b, and an antenna 126c. The modulating unit 126a acquires data to be transmitted to the card 200 from the control unit 170, and modulates a carrier wave used for communication with the card 200 using the acquired data. The demodulating unit 126b demodulates data superimposed on the carrier wave received from the card 200.

Accordingly, the transceiving unit 126 can transmit the data acquired from the control unit 170 to the card 200, and the card 200 can change information held in the card 200 in accordance with the received data. Further, the card 200 can transmit information held in the card 200 to the transceiving unit 126, and the information transmitted from the card 200 is acquired by the control unit 170. Examples of the information transmitted from the card 200 include an ID of the card 200, a name and a function of a character of a game corresponding to the card 200, display information for displaying a character, and the like.

The control unit 170 includes a first position information acquiring unit (first information acquiring unit) 170a, a second position information acquiring unit (second information acquiring unit) 170b, a card information acquiring unit 170c, a command execution processing unit 170d, a card rewrite information generating unit 170e, and a display processing unit 170f. Further, the respective constituent elements of the control unit 170 are constituted by a CPU and a program (software) causing the CPU to function.

The first position information acquiring unit (first information acquiring unit) 170a acquires detection information for the card 200 obtained by a plurality of R/Ws 122 and acquires the information stored in the card 200. Further, the first position information acquiring unit 170a acquires the detection information for the card 200 obtained by a plurality of R/Ws 122 and acquires information related to the position of the card 200 on the basis of the position of each of the R/Ws 122. Further, in the present embodiment, a plurality of R/Ws 122 have been described as being able to communicate with the card 200 at the same time, but as disclosed in Patent Literature 1, a plurality of antennas 126c may be switchably connected with one transceiving unit 126, and one antenna 126c used for transmission and reception of data with the card 200 may be selected. In this case, the position of the card 200 can be detected on the basis of the position of the antenna 126c performing communication with the card 200. The second position information acquiring unit 170b acquires detection information for the card 200 obtained by the touch pad 130 and acquires detailed information related to the position of the card 200. Further, the second position information acquiring unit 170b can also acquire a manipulation position of a finger on the touch pad 130. For example, in a case in which the touch pad 130 is constituted by a capacitive sensor, the second position information acquiring unit 170h can also acquire position information in a direction in which the card 200 gets away from the surface of the touch pad 130.

The card information acquiring unit 170c acquires the ID of the card 200, the information and the function corresponding to the character of the game corresponding to the card 200, and the like on the basis of the communication with the card 200 performed by the transceiving unit 126. The command execution processing unit 170d executes a process of a command corresponding to the information on the basis of the position information acquired by the first position information acquiring unit 170a and the second position information acquiring unit 170b and the information acquired by the card information acquiring unit 170c.

In a case in which the function or the like of the character corresponding to the card 200 is changed in accordance with play content of the game, the card rewrite information generating unit 170e generates card rewrite information related to the change. The display processing unit 170f performs a process for displaying on the display unit 110 in accordance with the position, the motion, the direction, or the like of the card 200 acquired by the first position information acquiring unit 170a and the second position information acquiring unit 170b, on the basis of the information of the card 200 acquired by the card information acquiring unit 170c, or in accordance with a process of a command executed by the command execution processing unit 170d. The display unit 110 performs display in accordance with the process of the display processing unit 170f.

For example, the display processing unit 170f performs a process for displaying the character of the game corresponding to the card 200 on the display unit 110 on the basis of the information of the card 200 acquired by the card information acquiring unit 170c. Further, the display processing unit 170f performs a process of moving the character displayed on the display unit 110 in accordance with the position, the motion, the direction, or the like of the card 200 acquired by the first position information acquiring unit 170a and the second position information acquiring unit 170b.

Figure 7:
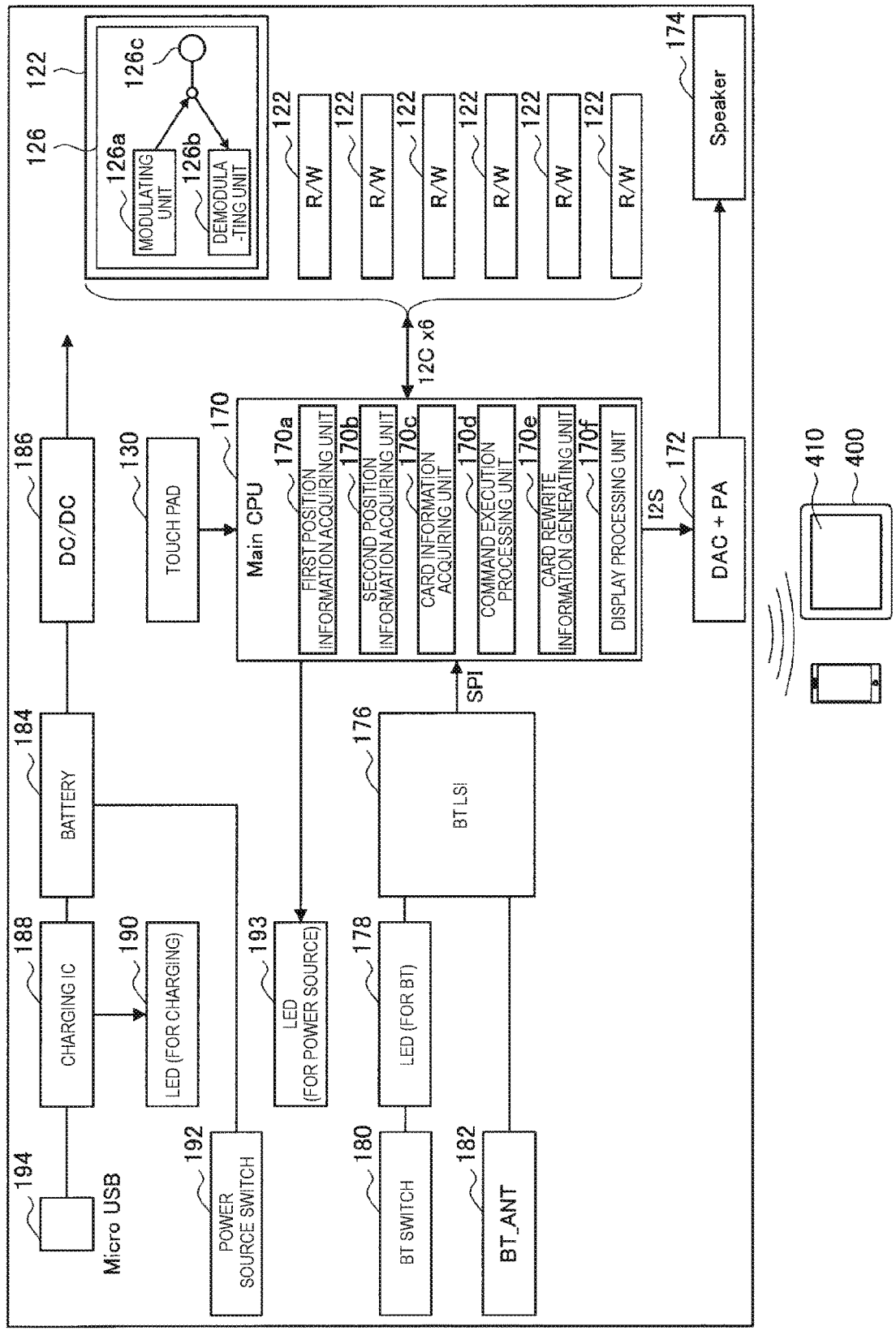
FIG. 7 is a schematic diagram illustrating a configuration of functional blocks of an information processing device in a case in which used in conjunction with an electronic device such as a smartphone.

Further, FIG. 7 is a schematic diagram illustrating a configuration of functional blocks of the information processing device 100 in a case in which the information processing device 100 is used in conjunction with an electronic device 400 such as a smartphone. The example in which the display unit 110 is installed in the information processing device 100 is illustrated in FIG. 1, but in the case in which the information processing device 100 is used in conjunction with the electronic device 400 such as a smartphone or the like, the display unit 110 may not be installed on the information processing device 100 side. In the example illustrated in FIG. 7, content of the display process performed by the display processing unit 177 is transmitted from the information processing device 100 to the electronic device 400 and displayed on a display unit 410 of the electronic device 400. To this end, the information processing device 100 and the electronic device 400 are configured to be able to communicate with each other by, for example, a Bluetooth (registered trademark) communication scheme or the like. Further, manipulation information in a manipulation button or a touch pad installed in the electronic device 400 is transmitted to the information processing device 100.

In the configuration illustrated in FIG. 7, the function of the display processing unit 170f installed in the information processing device 100 may be installed on the electronic device 400 side, in this case, for example, the information of the card 200 acquired by the card information acquiring unit 170c is transmitted from the information processing device 100 to the electronic device 400, and a display processing unit installed on the electronic device 400 side performs a process of display the character of the game corresponding to card 200 on the display unit 410 on the basis of the information of the card 200 acquired by the card information acquiring unit 170c. Further, the information such as the position, the motion, or the direction of the card 200 acquired by the first position information acquiring unit 170a and the second position information acquiring unit 170b is transmitted from the information processing device 100 to the electronic device 400, and the display processing unit installed on the electronic device 400 side performs a process of moving the character displayed on the display unit 410.

Figure 28:
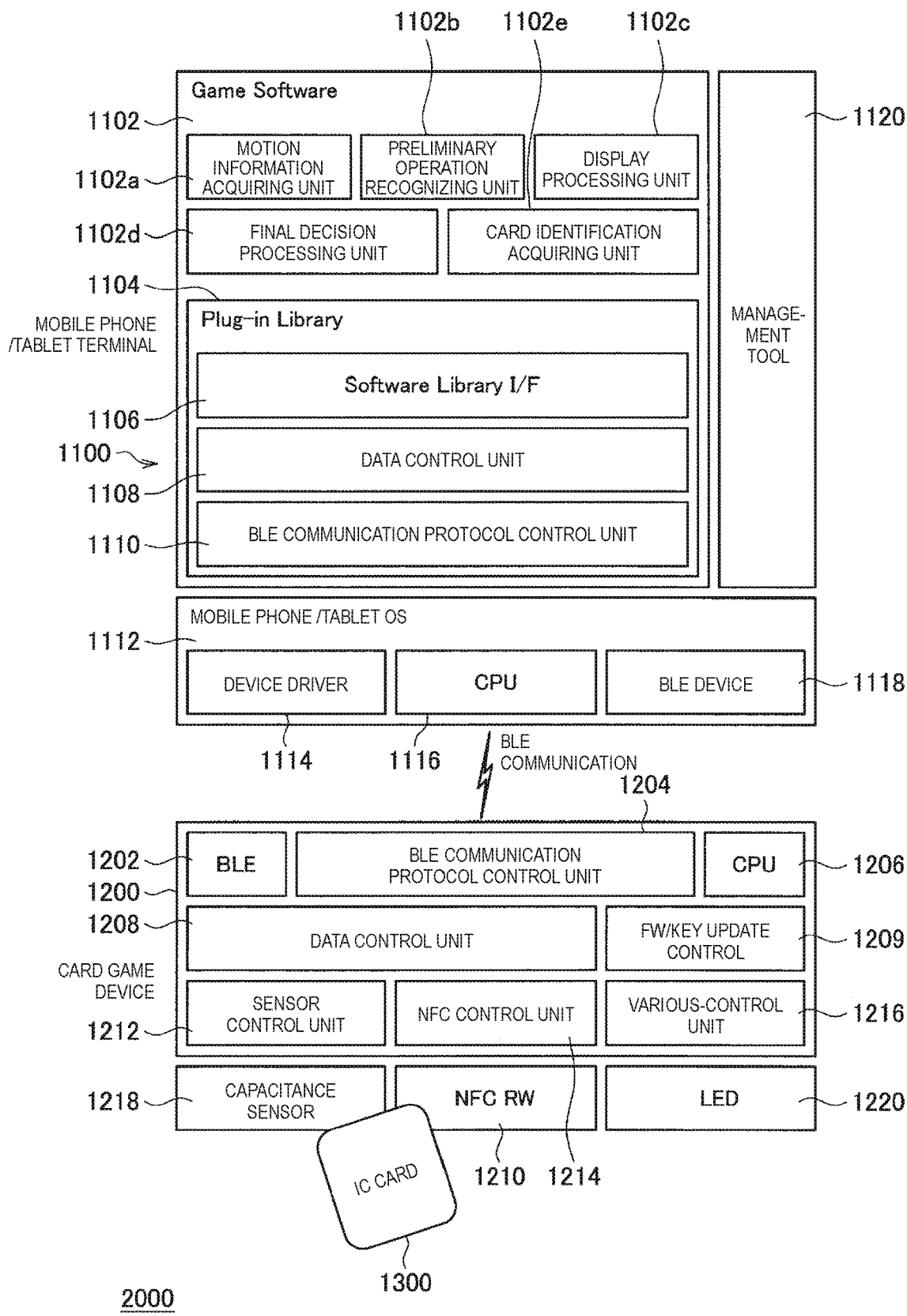
FIG. 28 is a schematic diagram illustrating a system including an information processing device, a reader/writer pad (a card game device), and an IC card.

Further, FIG. 28 is a schematic diagram illustrating a system 2000 including an information processing device 1100, a reader/writer pad (a card game device) 1200, and an IC card 1300. The information processing device 1100 is, for example, a device such as a mobile phone (a smartphone), a tablet terminal, or the like. The reader/writer pad 1200 is, for example, a device for performing a card game, has, for example, a flat plate shape, and configured such that a plurality of reader/writers (hereinafter referred to as "R/Ws") are arranged in a planar manner.

The reader/writer pad 1200 generates a carrier wave in accordance with the communication standard of NFC and performs communication with the card 1300. To this end, the R/W 1210 and the card 1300 perform transmission and reception of a carrier wave of a frequency (13.56 MHz) conforming to the communication standard of NFC using electromagnetic induction. On the other hand, the reader/writer pad 1200 and the card 1300 may communicate with each other in accordance with another communication standard different from NFC.

As described above, each of a plurality of R/Ws 1210 communicating with the card 1300 can generate a carrier wave in accordance with the communication standard of NFC and communicate with the card 1300. A plurality of R/Ws 1210 are arranged in a matrix form, and coordinates in a region of the R/W pad 1210 are decided in advance. Therefore, the reader/writer pad 1200 can detect the position (coordinate value) of the card 1300 on the basis of the position of each of the R/Ws 1210 communicating with the card 1300, and the R/W 1210 functions as a position information acquiring unit.

The information processing device 1100 and the reader/writer pad 1200 are configured to be able to communicate with each other by, for example, a Bluetooth (registered trademark) communication scheme or the like. Further, manipulation information performed by a manipulation button or the like of the reader/writer pad 1200 is transmitted to the information processing device 1100.

As illustrated in FIG. 28, the information processing device 1100 includes a game software 1102, a plug-in library 1104, a software library interface 1106, a data control unit 1108, a Bluetooth (BLE) communication protocol control unit 1110, an operation system 1112, a device driver 1114, a CPU 1116, a BLE device 1118, and a management tool 1120.

The game software 1102 is software that is connected with the reader/writer pad 1200 and enables the user to play. The plug-in library 1104 is a library which is included in the game software 1102 and used to control the reader/writer pad 1200. It is created by a creator who creates a game, a software company, or the like and incorporated into the information processing device 1100 by installation or the like. On the other hand, the plug-in library 1104 is a common library prepared by a manufacturer side of the information processing device 1100 and provides commonalized information to the game software 1102. Specifically, in the present embodiment, information indicating a type of card and information indicating the motion of the card (position information, speed information, information related to a moving direction or a moving distance, or the like) are transmitted from the plug-in library 1104 to the game software 1102. On the game software 1102 side, a game can be freely constructed on the basis of such information. The software library interface 1106 is an interface used when the game software 1102 accesses the plug-in library 1104. The data control unit 1108 extracts a card operation from data (a coordinate value and a card type) acquired from the reader/writer pad 1200. The data control unit 1108 acquires specific information such as the moving speed, the moving direction, the moving distance, a turning radius, or the like from the coordinates information of the card 1300, The BLE (Bluetooth (a registered trademark)) communication protocol control unit 1110 performs protocol control for performing BLE communication with the reader/writer pad 1200. The management tool 1120 controls a communication process with an external server such as firmware update of the reader/writer pad 1200.

The operation system 1112 corresponds to an operation system installed in a mobile phone or a tablet terminal. The device driver 1114, the BLE device 1118, and the CPU 1116 are hardware installed in the information processing device 1100. Further, each of the constituent elements illustrated in FIG. 28 can be constituted by the CPU 1116 (central processing unit) and a program (software) causing the CPU 1116 to function. In this case, the program may be stored in a recording medium such as a memory installed the information processing device 1100.

The game software 1102 causes the CPU 1116 to function as a position information acquiring unit 1102a, a preliminary operation recognizing unit 1102b, a display processing unit 1102c, a final decision processing unit 1102d, and a card identification acquiring unit 1102e, The motion information acquiring unit 1102a acquires information related to the motion of the card 1300 from the plug-in library 1104. Further, the information related to the motion of the card 1300 is acquired by the data control unit 1108 of the plug-in library 1104 and transferred to the game software 1102, but the data control unit 1108 acquires more specific information such as whether the motion is a motion in a vertical direction or a horizontal direction, a motion along a straight line, a motion along a circular arc, a motion in a direction away from the surface of the reader/writer pad 1200, or a motion in a direction of adjacency in addition to the coordinate information of the card 1300 acquired from the reader/writer pad 1200 and provides the acquired information to the game software if necessary. The plug-in library 1104 provides the motion information of the card 1300 such as the position information to the game software 1102 in response to a request from the game software 1102. The preliminary operation recognizing unit 1102b recognizes a preliminary operation of the card 1300 on the basis of the motion information. The display processing unit 1102c performs a process of displaying the recognized preliminary operation (an operation icon) of the card 1300 and a main operation. In a case in which the preliminary operation is recognized as being continued while the preliminary operation is being displayed, the final decision processing unit 1102d finally decides the preliminary operation as the main operation. The card identification acquiring unit 1102e acquires the card type on the basis of a card type ID obtained from the card 1300.

Further, as illustrated in FIG. 28, the reader/writer pad 1200 includes a BLE device 1202, a BLE communication protocol control unit 1204, a CPU 1206, a data control unit 1208, an FW/key update control unit 1209, a sensor control unit 1212, an NFC control unit 1214, a various-control unit 1216, and R/Ws 1210. The reader/writer pad 1200 further includes a capacitance sensor 1218 that detects capacitance and detects the position of the card 1300 and an LED 1220 for performing display.

The BLE device 1202 performs communication according to Bluetooth (a registered trademark) with the BLE device 1118. The BLE communication protocol control unit 1204 controls a protocol for BLE communication. The data control unit 1208 performs card read/write control and sensor data control. The FW/key update control unit 1209 performs update control for firmware (FW) and a card access key. The sensor control unit 1212 controls the capacitance sensor 1218. The NFC control unit 1214 controls an NFC reader/writer (the R/W 1210). The various-control unit 1216 performs various kinds of device controls of the card game device.

In the above configuration, in a case in which the user moves the card 1300 above the reader/writer pad 1200, display is performed on the information processing device 1100 in accordance with the motion of the card 1300.

4. Play Content of Game

As described above, according to the information processing device 100 of the present embodiment, it is possible to accurately detect a position or a state of the card 200 placed on the R/W pad 120 and the touch pad 130. Accordingly, it is possible to give various commands to the information processing device 100 in accordance with the position or the state of the card 200, and it is possible to play the game in accordance with the command. An overview of an example of a game playing method implemented by the system of the present embodiment will be described below.

Figure 8:
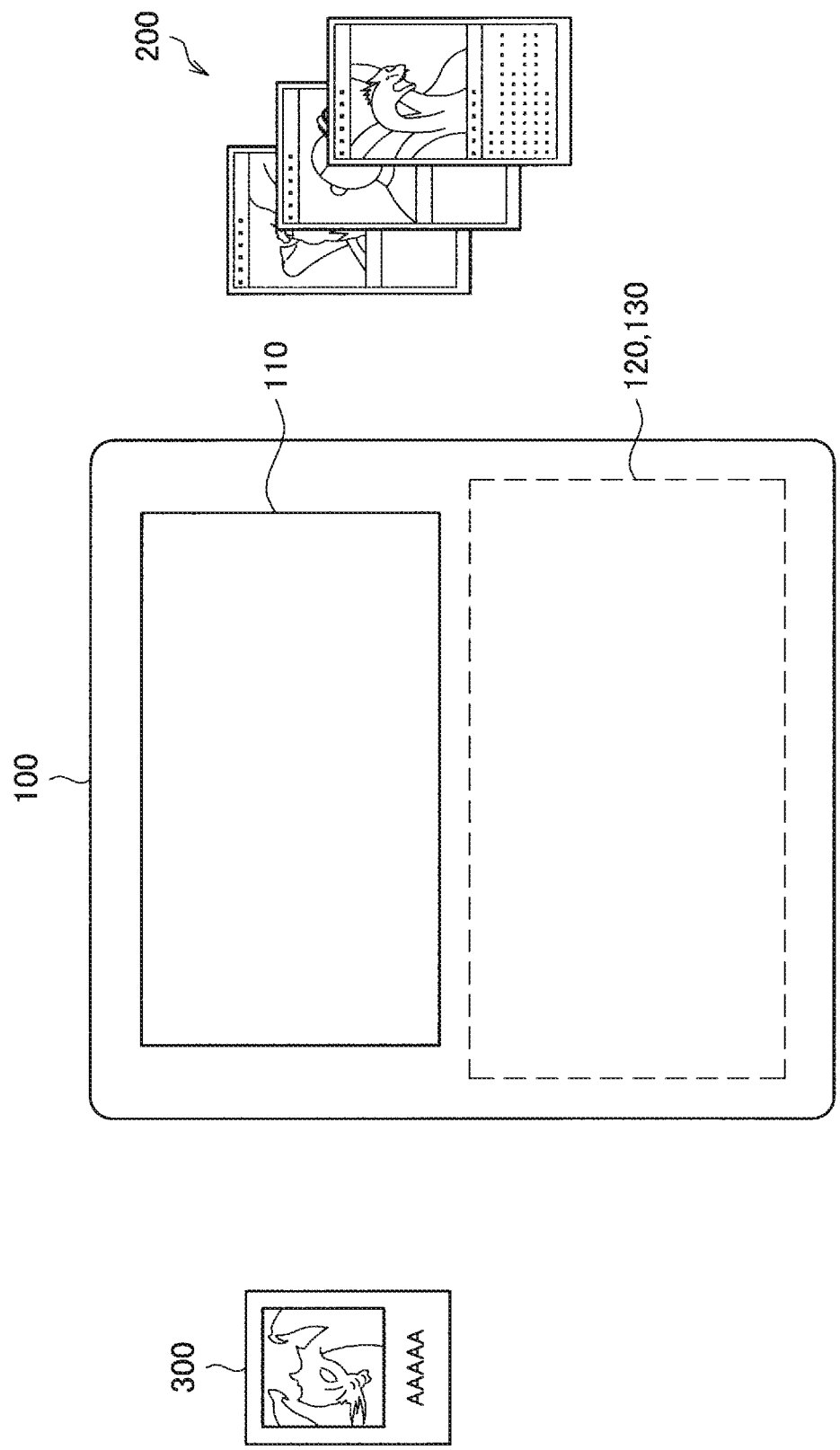
FIG. 8 is a schematic diagram for describing game play performed by an information processing device.
Figure 9:
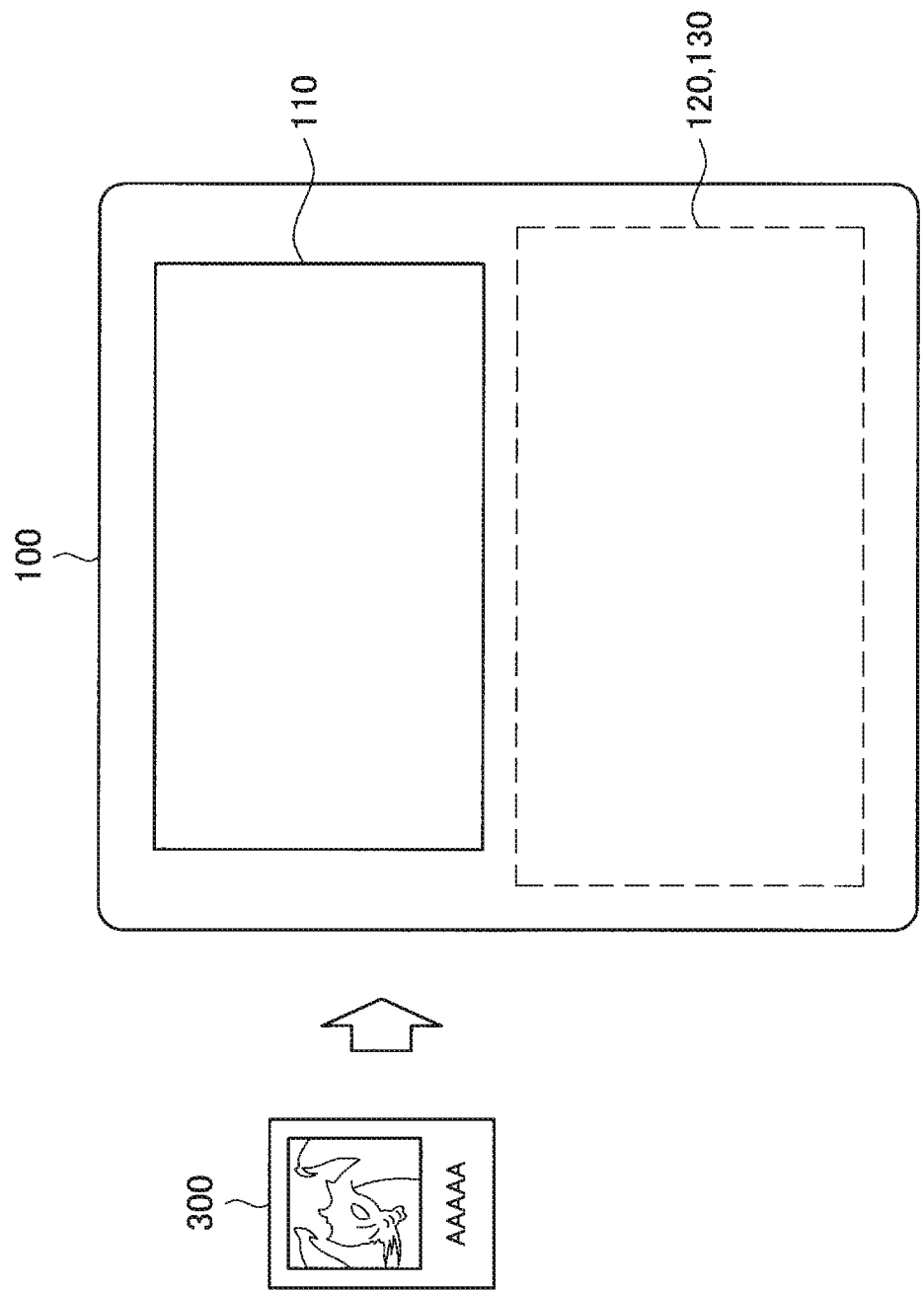
FIG. 9 is a schematic diagram for describing game play performed by an information processing device.
Figure 10:
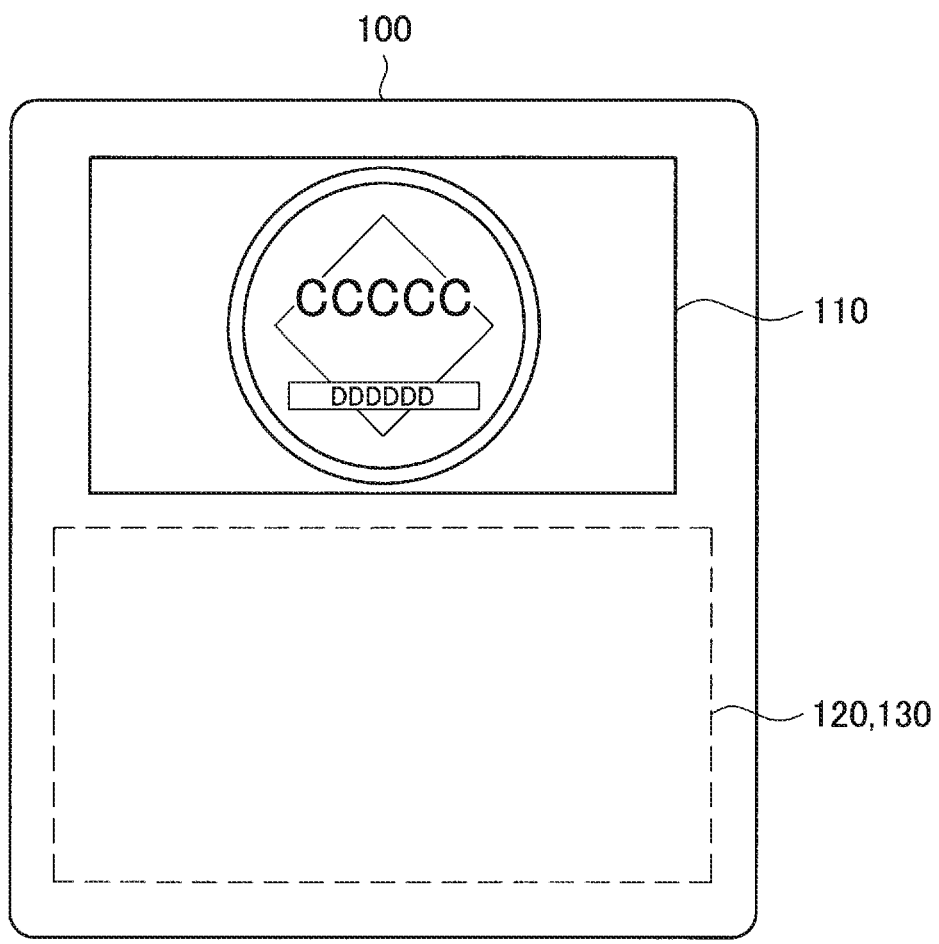
FIG. 10 is a schematic diagram for describing game play performed by an information processing device.

First, activation of a game will be described. As illustrated in FIG. 8, the information processing device 100, the card 200, and the game software 300 are prepared. Then, as illustrated in FIG. 9, the game software 300 is inserted into the information processing device 100, and electric power is turned on. Accordingly, as illustrated in FIG. 10, the information processing device 100 is activated, and a game title is displayed on the display unit 110. Further, instead of inserting the game software 300, the game software may be downloaded via a network such as the Internet.

Figure 11:
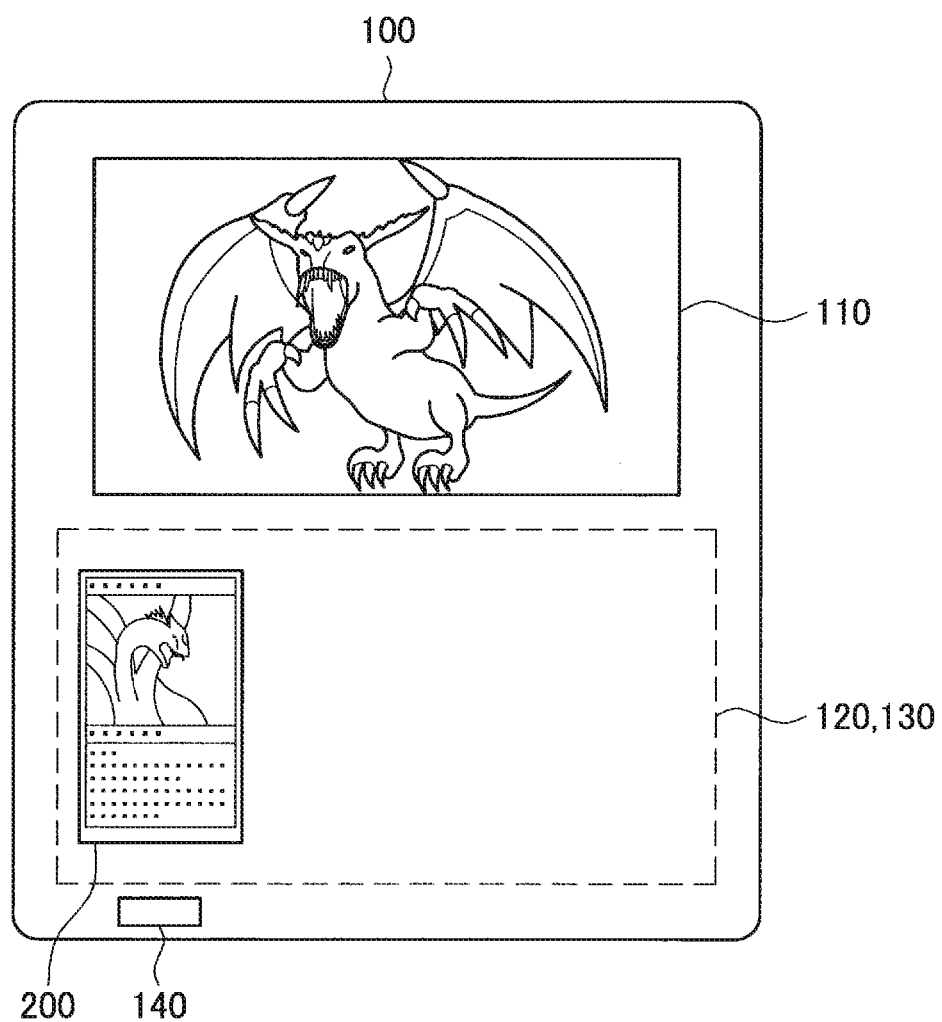
FIG. 11 is a schematic diagram for describing game play performed by an information processing device.

Then, as illustrated in FIG. 11, in a case in which the card 200 of a monster is held over the R/W pad 120, the monster appears as a character of the game on the display unit 110. At this time, the card information acquiring unit 170c of the control unit 170 acquires information related to the character of the game from the card 200, and the display processing unit 177 performs a process of displaying the character of the game corresponding to the card 200 on the display unit 110 on the basis of the information of the card 200 acquired by the card information acquiring unit 170c. Further, if the card 200 includes a plurality of IC chips 222, and a plurality of IC chips 222 are asymmetrically arranged on a plane, the information processing device 100 holds arrangement information of a plurality of IC chips 222 in advance, and thus the information processing device 100 can detect whether or not one of the top surface or the back surface of the card 200 is held over the R/W pad 120 and execute a command corresponding to a direction in which the card 200 is held over.

Figure 12:
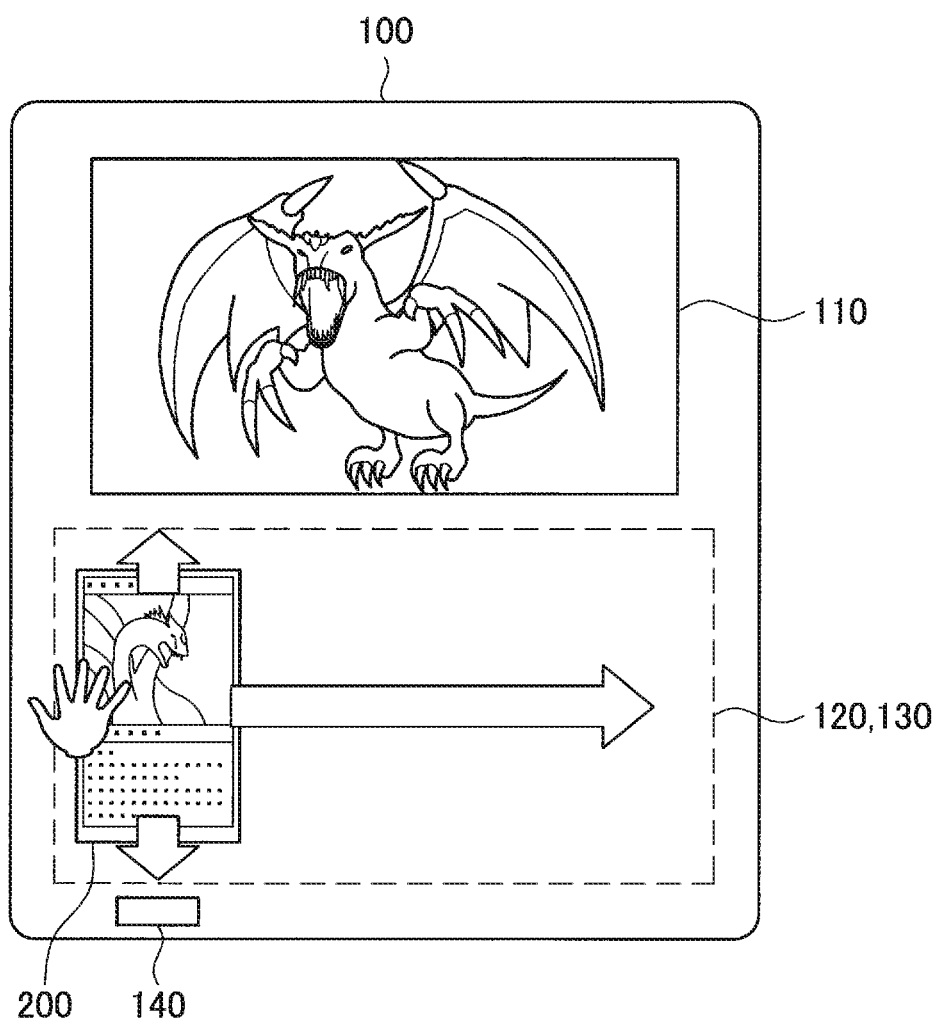
FIG. 12 is a schematic diagram for describing game play performed by an information processing device.

The user can use the monster to play against other users or a computer. For example, as illustrated in FIG. 12, it is possible to move the card 200 up, down, left, or right and attack or defend. At this time, the first position information acquiring unit 170a acquires the detection information for the card 200 obtained by a plurality of R/Ws 122, and acquires the information related to the position of the card 200. Further, the second position information acquiring unit 170b acquires the detection information for the card 200 obtained by the touch pad 130 and acquires detailed information related to the position of the card 200. The command execution processing unit 175 executes a process of a command corresponding to such information on the basis of the position information acquired by the first position information acquiring unit 170a and the second position information acquiring unit 170b and the information acquired by the card information acquiring unit 170c. By executing the process of the command, a result of attacking or defending an opponent is obtained. The display processing unit 170f performs a process of displaying a motion of the monster on the display unit 110 in accordance with the position, the motion, the direction, or the like of the card 200 acquired by the first position information acquiring unit 170a and the second position information acquiring unit 170b, and performs a process of displaying a result of attack or defense on the display unit 110 in accordance with a command processing result.

Figure 13:
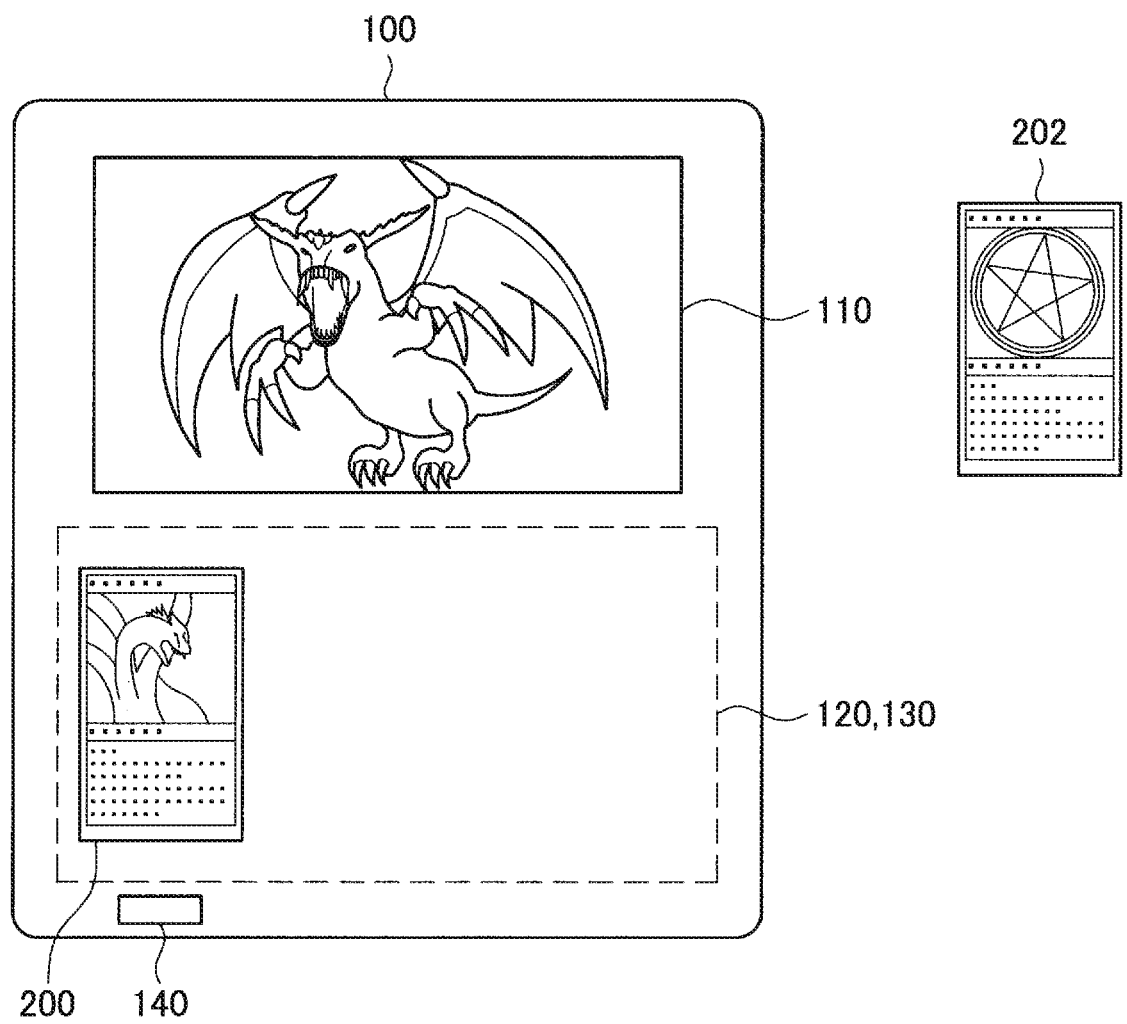
FIG. 13 is a schematic diagram for describing game play performed by an information processing device.
Figure 14:
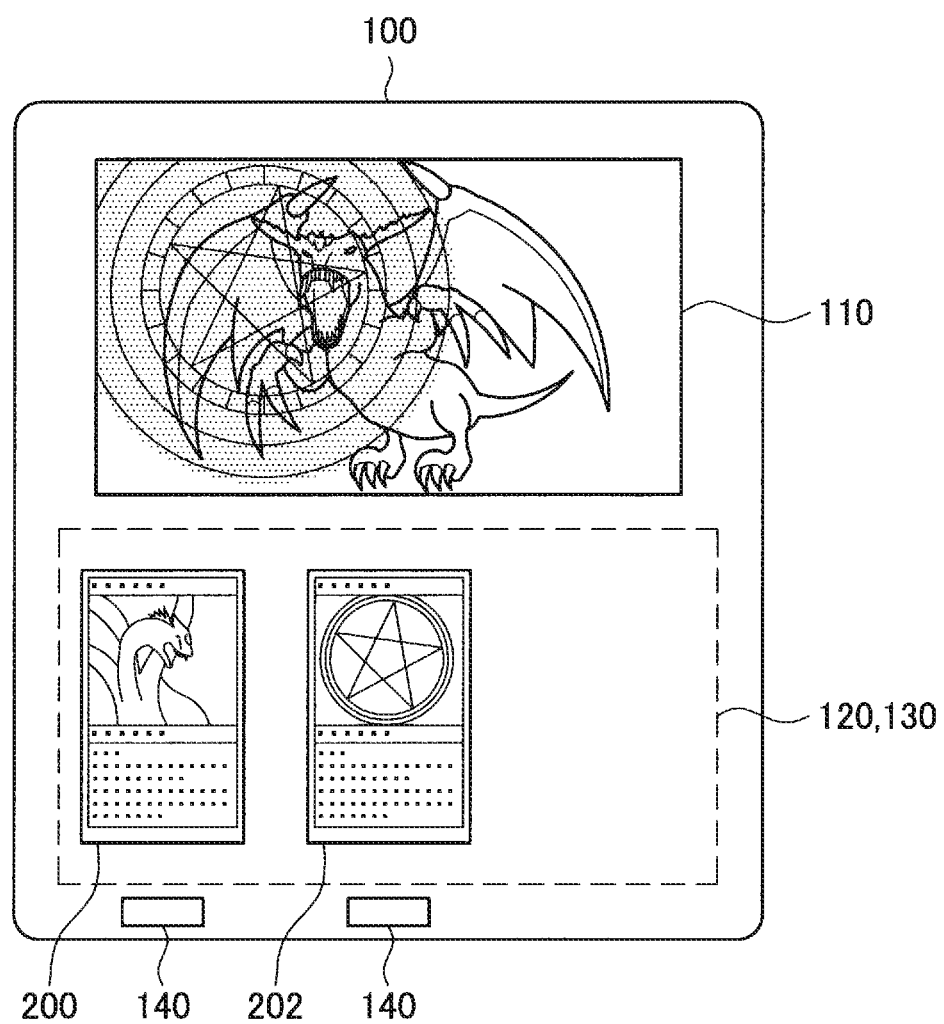
FIG. 14 is a schematic diagram for describing game play performed by an information processing device.

Further, as illustrated in FIG. 13, it is also possible to use a card 202 of an item which is purchased additionally. For example, when the card 202 of the item which is purchased additionally is placed over the R/W pad 120 together with the card 200 as illustrated in FIG. 14, it is possible to increase a combat capability of the monster corresponding to the card 200. In this case, the card information acquiring unit 170c acquires IDs of the two cards 200 and 202 or information, functions, or the like corresponding to the characters of the game corresponding to the cards 200 and 202. Further, a level of a character corresponding to the card 200 is increased on the basis of the information acquired from the card 202. Further, for example, if a battle with an opponent is won, the level of the monster (combat capability) can be increased.

Figure 15:
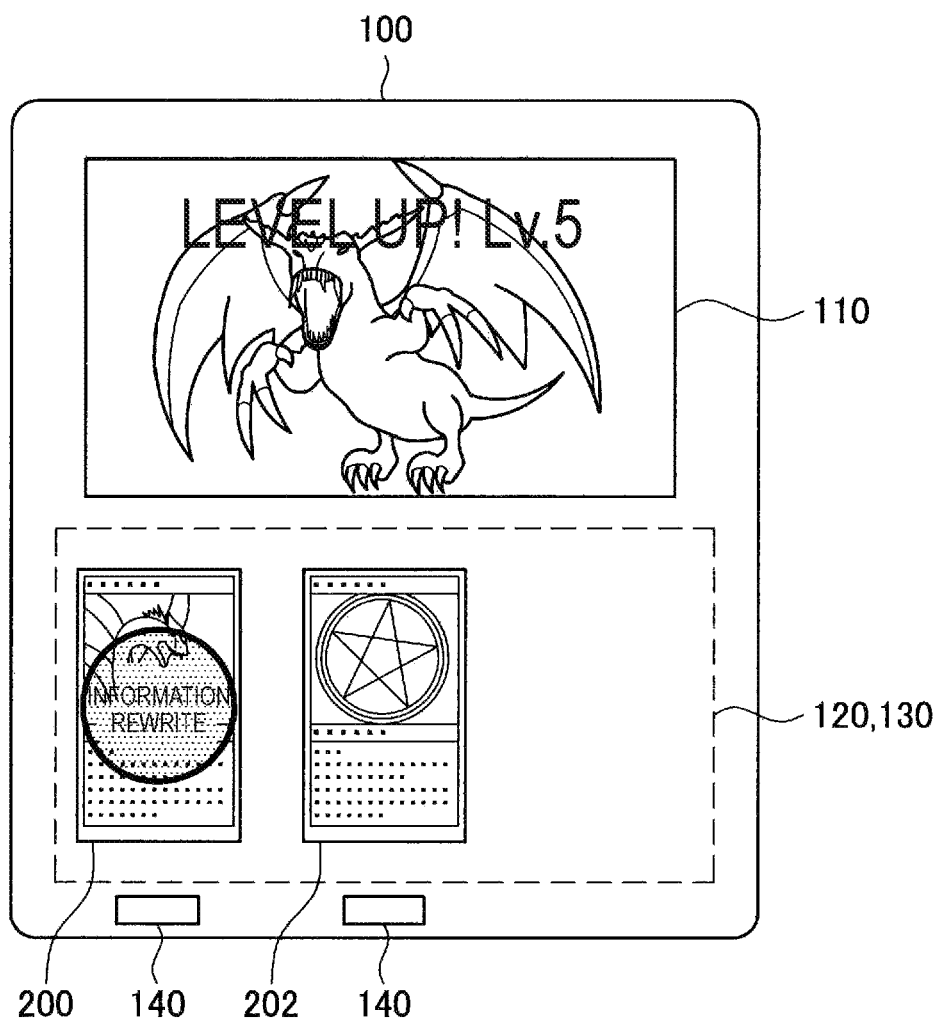
FIG. 15 is a schematic diagram for describing game play performed by an information processing device.

As illustrated in FIG. 15, if the level of the monster is increased, the information is written in the card 200, and the combat capability of the monster corresponding to the card 200 becomes stronger. The card rewrite information generating unit 170e of the control unit 170 generates card rewrite information for changing the level of the character corresponding to the card 200. If the card rewrite information is transmitted to the card 200 through the transceiving unit 126, the information of the card 200 is rewritten, and the level of the character corresponding to the card 200 is changed.

In addition to the card 202, it is possible to use a stronger character by purchasing an additional card pack. Further, since a rare card is included in the card pack at a low probability, it is possible to increase a collector desire. Further, the user can challenge a new stage by charging.

Figure 16:
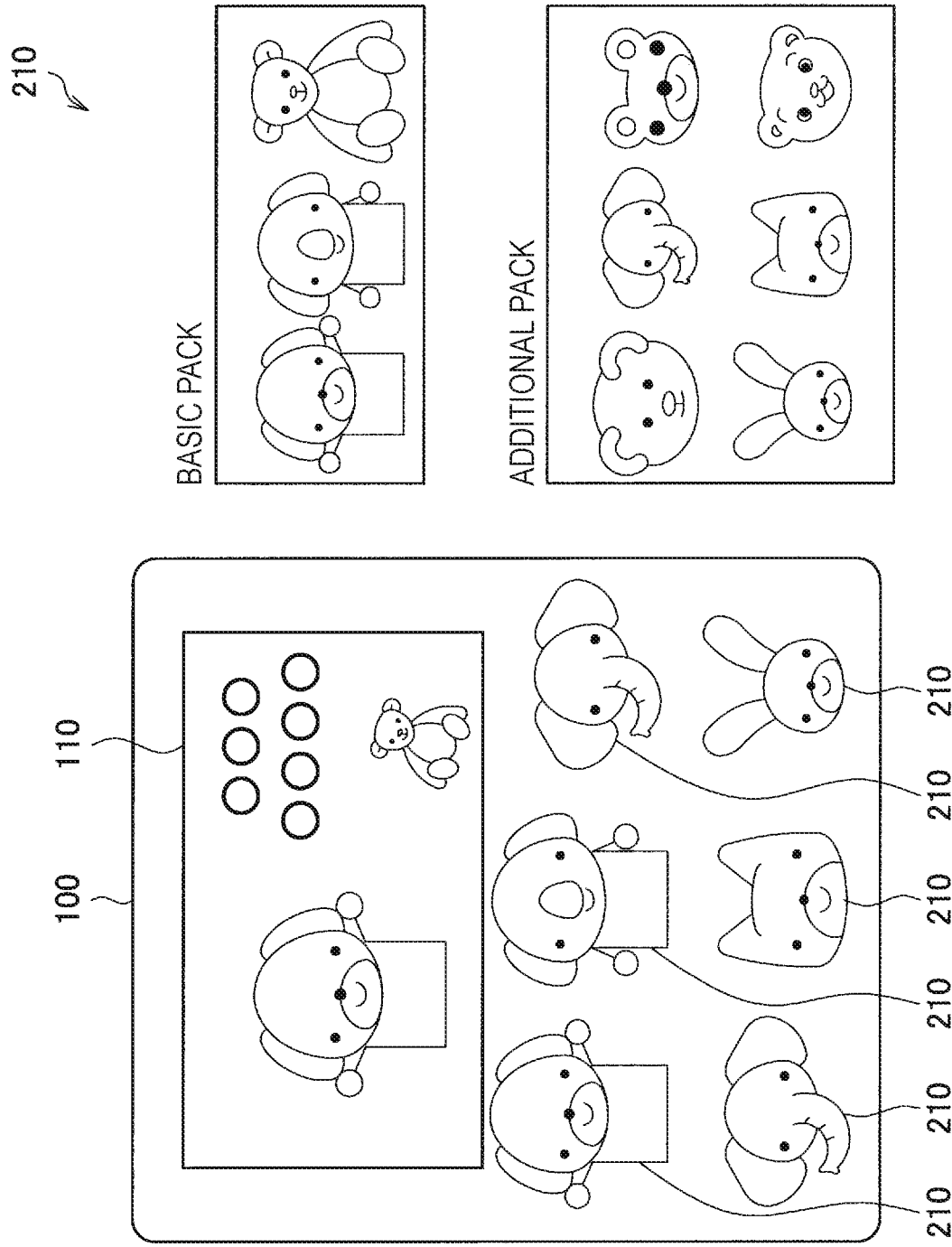
FIG. 16 is a schematic diagram for describing game play performed by an information processing device.

Further, as illustrated in FIG. 16, a FIG. 210 can be used instead of the card 200. In this case, it is also possible to implement a game using a figure of a popular character. The FIG. 210 includes a similar chip as the IC chip 222 installed in the card 200 and has a similar function to that of the card 200. Therefore, even in a case in which the FIG. 210 is used, it is possible to perform a game play similar to the card 200.

Figure 17:
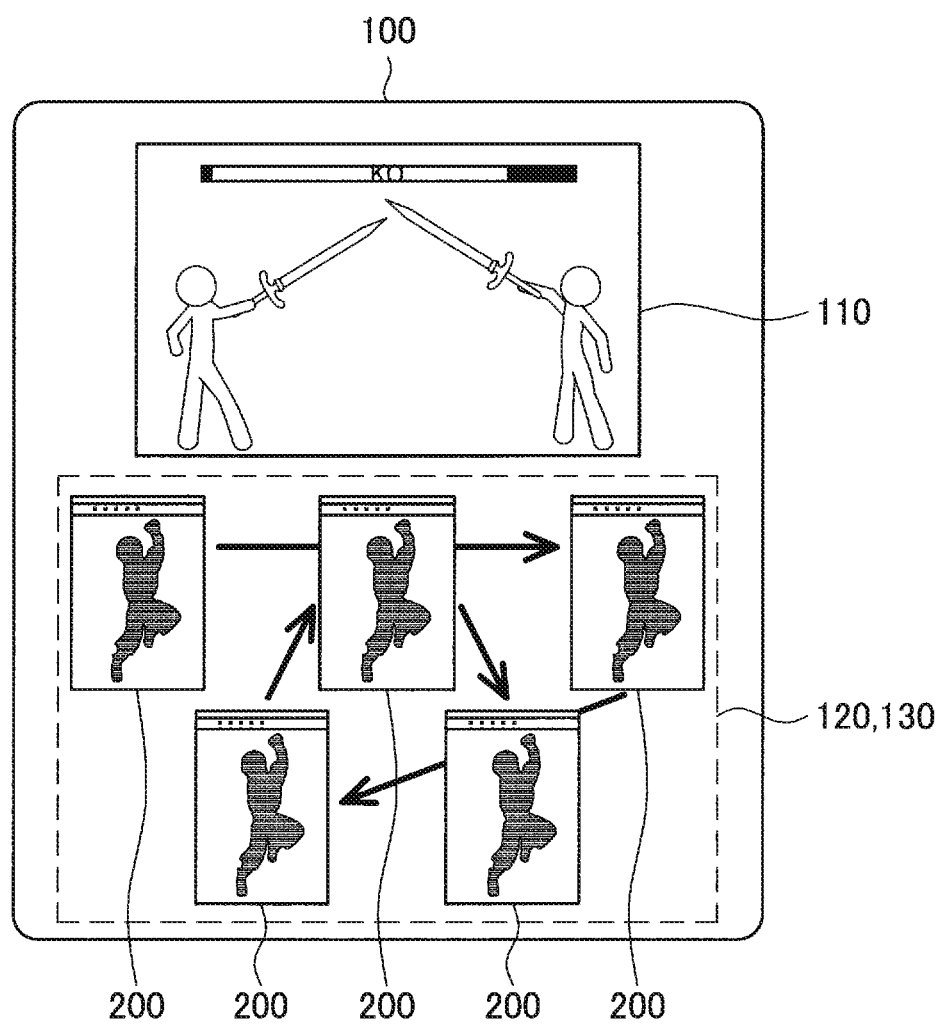
FIG. 17 is a schematic diagram for describing game play performed by an information processing device.

FIG. 17 is a schematic diagram illustrating a case in which a fighting game is performed using the card 200. Since the information processing device 100 can detect the motion of the card 200, by moving the card 200 in a fighting game or the like, it is possible to manipulate a command to be transmitted from the card 200 to the information processing device 100 and activate a skill according to the motion. The command execution processing unit 170d performs a process of a command corresponding to such information on the basis of the position information acquired by the first position information acquiring unit 170a and the second position information acquiring unit 170b and the information acquired by the card information acquiring unit 170c.

Figure 18:
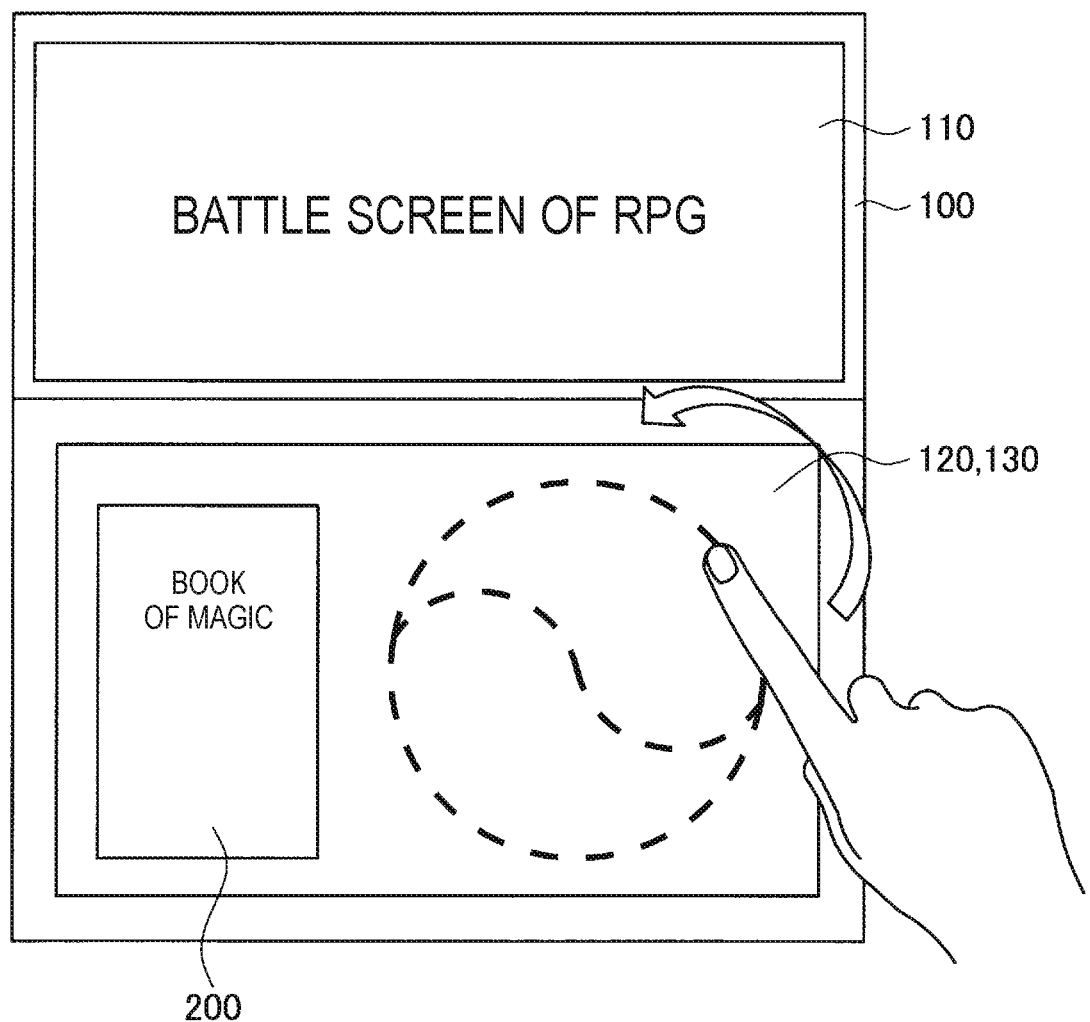
FIG. 18 is a schematic diagram for describing game play performed by an information processing device.

FIG. 18 is a schematic diagram illustrating an example in which a command is input by both the card 200 and a touch manipulation. As described above, it is possible to transmit a command using information associated with a touch manipulation together with the information transmitted from the card 200 and the position information of the card 200. In this case, the second position information acquiring unit 170b acquires position information associated with the touch manipulation. The command execution processing unit 170d performs a process of a command corresponding to such information on the basis of the position information acquired by the first position information acquiring unit 170a and the second position information acquiring unit 170b and the information acquired by the card information acquiring unit 170c. The display processing unit 170f performs a display process in accordance with execution of the process of the command.

Figure 19:
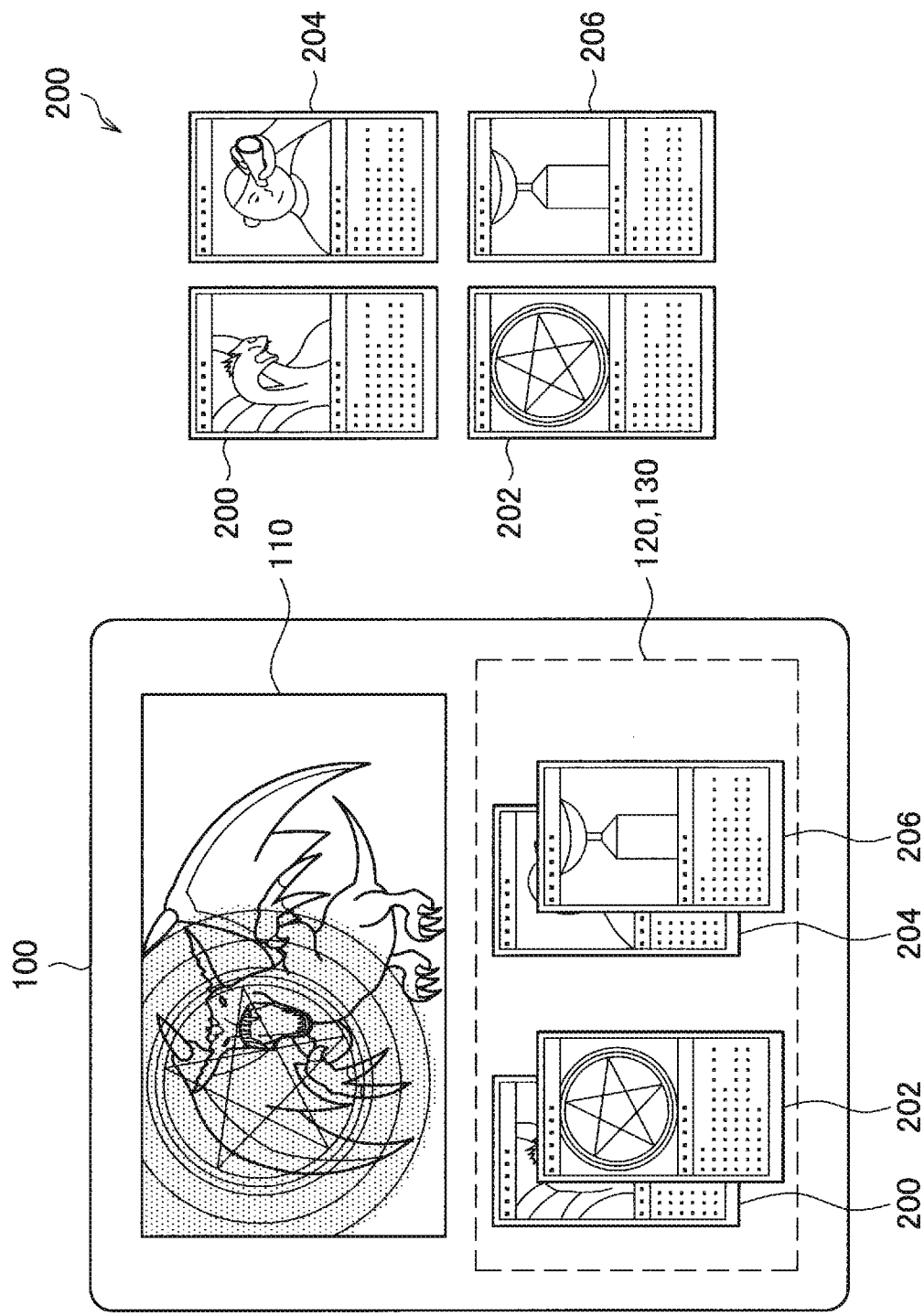
FIG. 19 is a schematic diagram for describing game play performed by an information processing device.

FIG. 19 is a schematic diagram illustrating an example of transmitting a command to the information processing device 100 by stacking the card 200. As an example of a command given by stacking the card 200, for example, there is an example of exerting an effect such as a character function recovery or a magic performed by a character. In this case, if the cards 200 and 202 are determined to be stacked on the basis of the position information of the cards 200 and 202 acquired by the first position information acquiring unit 170a and the second position information acquiring unit 170b, a process of a command corresponding to the stacking of the cards 200 and 202 is performed by the command execution processing unit 170d. Similarly, if the cards 200 and 202 are determined to be stacked on the basis of the position information of the cards 204 and 206 acquired by the first position information acquiring unit 170a and the second position information acquiring unit 170b, a process of a command corresponding to the stacking of the cards 204 and 206 is performed by the command execution processing unit 170d.

Figure 20:
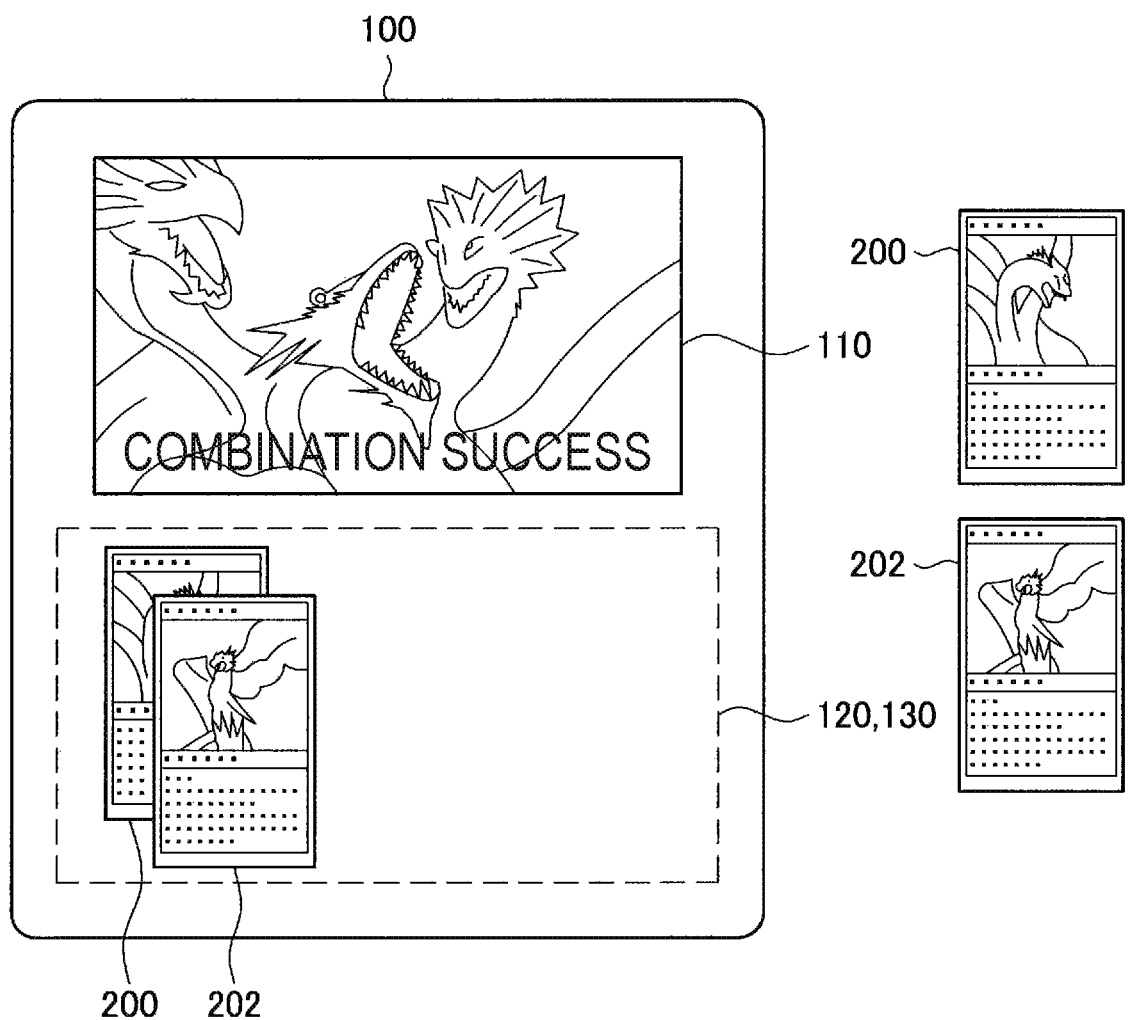
FIG. 20 is a schematic diagram for describing game play performed by an information processing device.

Further, FIG. 20 is a schematic diagram illustrating an example of generating a new character by stacking the cards 200 and 202. In this case, if the cards 200 and 202 are determined to be stacked on the basis of the position information of the cards 200 and 202 acquired by the first position information acquiring unit 170a and the second position information acquiring unit 170b, a command of generating a new character is performed by the command execution processing unit 170d. The display processing unit 170f performs a display process on the display unit 110 in accordance with a result of processing the command. The card rewrite information generating unit 170e generates the card rewrite information for rewriting character data of the card 200. In a case in which the card rewrite information is transmitted to the card 200 through the transceiving unit 126, the character data of the card 200 is rewritten.

Figure 21:
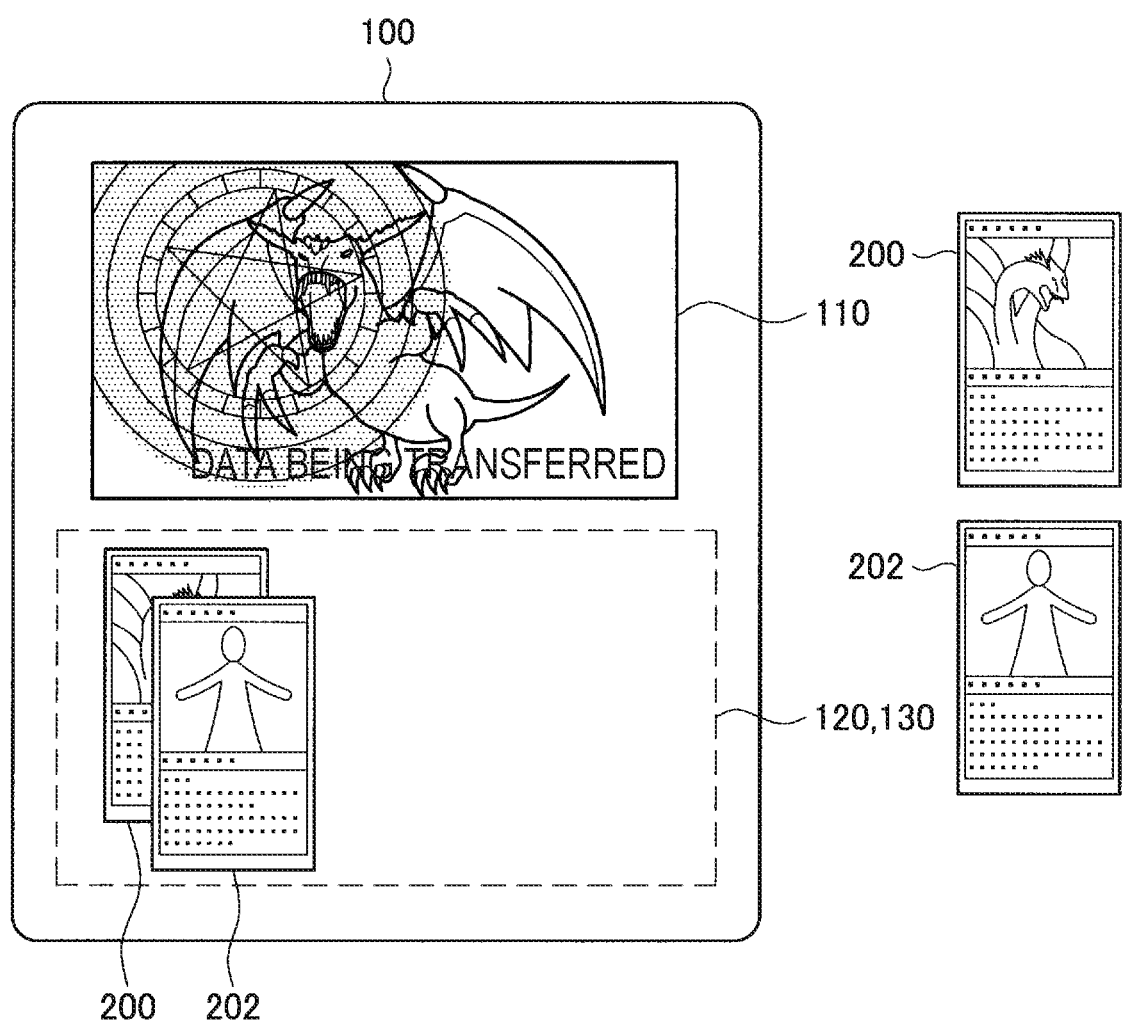
FIG. 21 is a schematic diagram for describing game play performed by an information processing device.

FIG. 21 is a schematic diagram illustrating an example of strengthening the character by transferring experience value data. In this case, if the cards 200 and 202 are determined to be stacked on the basis of the position information of the cards 200 and 202 acquired by the first position information acquiring unit 170a and the second position information acquiring unit 170b, a command of transferring the experience value data of the card 202 to the card 200 is performed by the command execution processing unit 170d. The card rewrite information generating unit 170e generates the card rewrite information for rewriting the experience value data of the card 200. If the card rewrite information is transmitted to the card 200 through the transceiving unit 126, the experience value data of the card 200 is rewritten.

Figure 22:
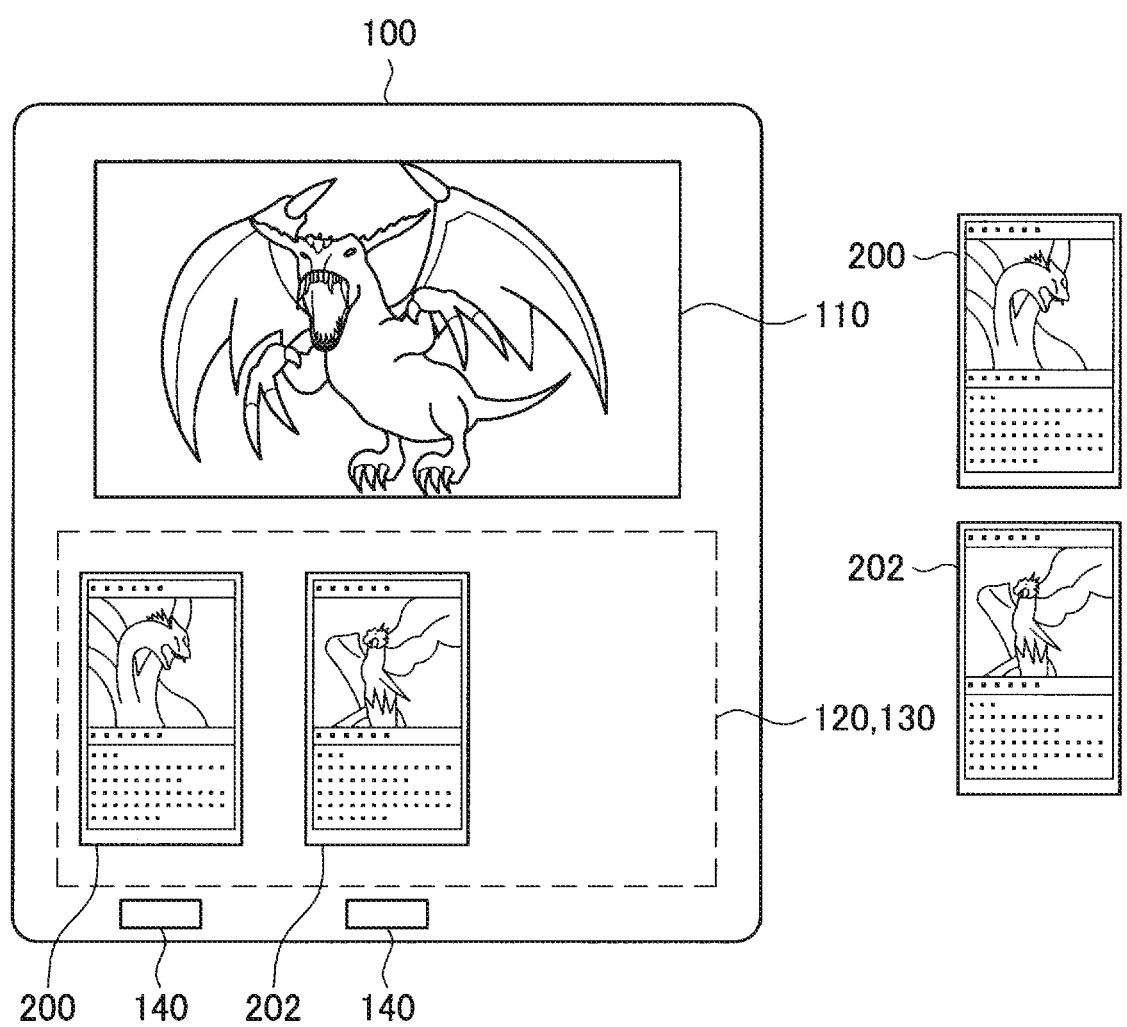
FIG. 22 is a schematic diagram for describing game play performed by an information processing device.

FIG. 22 is a schematic diagram illustrating an example of exerting a new effect in accordance with a combination of cards. In this case, the card information acquiring unit 170c acquires the information of the cards 200 and 202, and the command execution processing unit 170d performs a process of a command for exerting a new effect on the basis of the information acquired by the card information acquiring unit 174.

FIG. 23 is a schematic diagram illustrating an example in which, if the card 200 is brought closer to the information processing device 100, a display effect obtained by approaching the card 200 appears, and a character which is actually held over appears. For example, the monster gradually appears on the display unit 110 if the card 200 is brought closer to the information processing device 100, and a command is executed if the card 200 actually touches the information processing device 100. In this case, the second position information acquiring unit 170b acquires the detection information for the card 200 obtained by the touch pad 130, and detects that the card 200 gets away from the surface of the touch pad 130 in accordance with a distance to the card 200. If the second position information acquiring unit 170b detects that the card 200 gets away from the surface of the touch pad 130, the display processing unit 170f performs a process of displaying on the display unit 110 in accordance with a detection result. Further, the second position information acquiring unit 170b acquires the detection information for the card 200 obtained by the touch pad 130, and if it is detected that the card 200 comes into contact with the surface of the touch pad 130, the second position information acquiring unit 170h performs a process of displaying on the display unit 110 in accordance with a detection result. Further, the command execution processing unit 170d performs a process of a command corresponding to a distance to the card 200.

FIG. 24 is a schematic diagram illustrating an example in which a time stamp-like function is added to the card 200 side, and an effect does not affect from a card which is held over once for several minutes. FIG. 25 is a schematic diagram illustrating an example of a time stamp in which health power is recovered if the card 200 gets away from the surface of the information processing device 100 for a while and is held over after several minutes. In the example illustrated in FIG. 24, a period of time in which the card 200 is held over for the first time is stored on the side of the information processing device 100, and no command is received by the card 200 during a predetermined period of time (several minutes) thereafter. Further, in the example illustrated in FIG. 25, a period of time in which the card 200 is held over for the first time is stored on the side of the information processing device 100, and the health power of the character is recovered if the card 200 is held over after a predetermined period of time (several minutes) elapses.

Figure 26:
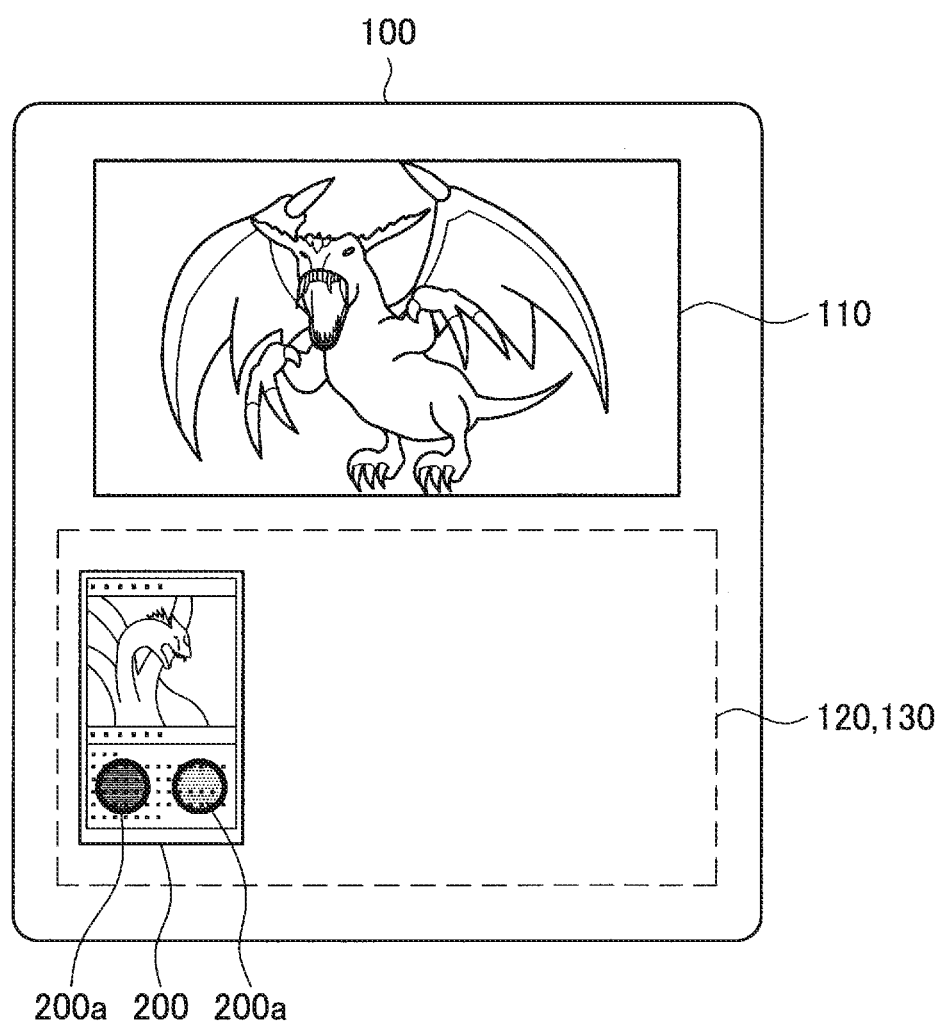
FIG. 26 is a schematic diagram for describing game play performed by an information processing device.
Figure 27:
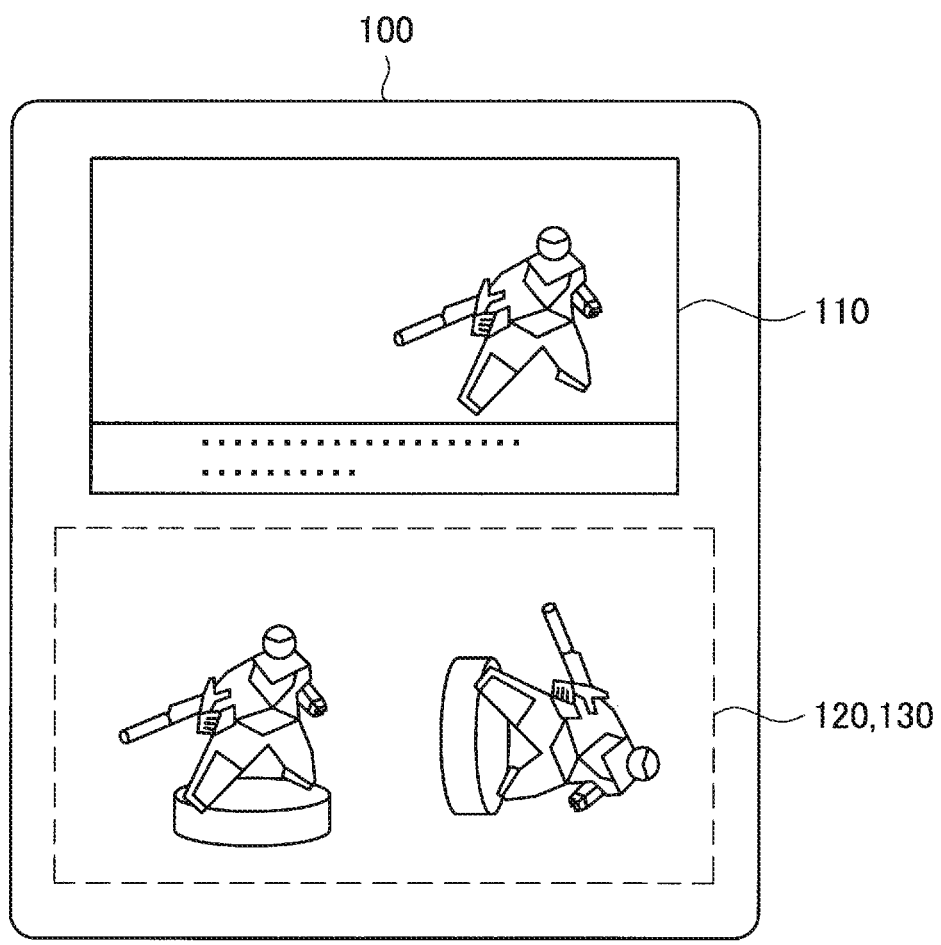
FIG. 27 is a schematic diagram for describing game play performed by an information processing device.

FIG. 26 is a schematic diagram illustrating an example in which the card 200 is used together with a switch 200a such as a button installed on the card 200, and illustrates an example of executing a command such as attack/defense by pressing the button 200a. In this case, information indicating that the button 200a is pushed down is received by the transceiving unit 126. The command execution processing unit 170d performs a process corresponding to the pushing of the button 200a, and the display processing unit 170f performs a display process corresponding to the pushing of the button 200a. FIG. 27 is a schematic diagram illustrating an example of tilt detection in which communication between the R/W 122 and the IC chip 222 of the FIG. 210 is canceled if the FIG. 210 is fallen down. In the example illustrated in FIG. 27, since a posture of the FIG. 210 detected by the touch pad differs between a case in which the FIG. 210 is standing and a case in which the FIG. 210 is fallen down, communication between the R/W 122 and the IC chip 222 of the FIG. 210 can be canceled if the FIG. 210 is fallen down. Further, for example, it is possible to give a notification indicating a change in the posture of the FIG. 210 to the information processing device 100 side by detecting the change in the internal state of the FIG. 210 and performing communication with the R/W 122 by NFC, or blocking communication. As an example, if a structure in which physical disconnection occurs in the FIG. 210 depending on the posture is provided, it is possible to block communication with the R/W 122 in accordance with the change in the posture of the FIG. 210. As a configuration to cause the physical disconnection to occur, a configuration in which if the FIG. 210 is fallen down, an inside ball moves and physically blocks communication. Further, for example, a sensor such as a tilt sensor or an acceleration sensor may be installed in the FIG. 210, and the tilt or the falling of the FIG. 210 may be detected, and the information may be transferred to the R/W 122 by NFC.

Further, the game playing method using the card 200 is merely an example, and as long as the position of the card 200 is detected by the R/W pad 120 including a plurality of R/Ws 122 and another sensor, it belongs to the category of the present disclosure.

As described above, according to the present embodiment, it is possible to obtain the position of the card 200 accurately using the reader/writer pad 120 and touch pad 130 (or the photodiode 160) together. Therefore, it is possible to perform display according to the motion of the card 200. It is connected with the card 200 so that communication is performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

a first information acquiring unit configured to acquire identification information of an RFID tag on a basis of communication with the RFID tag according to near field wireless communication; and a second information acquiring unit configured to acquire position information of the RFID tag in a method different from a method used by the first information acquiring unit, in which the position information is transmitted to an external device.

(2)

The information processing device according to (1), in which the first information acquiring unit acquires the position information of the RFID tag on a basis of the communication with the RFID tag according to the near field wireless communication.

(3)

The information processing device according to (1), including a display processing unit configured to perform a display process of performing display on a display unit on a basis of the position information of the RFID tag acquired by the first information acquiring unit and the second information acquiring unit.

(4)

The information processing device according to (2), in which the first information acquiring unit acquires the position information of the RFID tag on a basis of information acquired from a plurality of readers/writers performing the near field wireless communication with the RFID tag.

(5)

The information processing device according to (1), in which the second information acquiring unit acquires the position information of the information recording medium on a basis of information acquired from a capacitance sensor configured to detect a position of the information recording medium.

(6)

The information processing device according to (1), in which the second information acquiring unit acquires the position information of the information recording medium on a basis of information acquired from an optical sensor that detects a position of the information recording medium.

(7)

The information processing device according to (3), in which the display processing unit performs a display process of performing display on a display unit on a basis of the identification information.

(8)

The information processing device according to (2), including a command execution processing unit configured to execute a process of a command corresponding to the position information on a basis of the position information acquired by the first information acquiring unit or the second information acquiring unit.

(9)

The information processing device according to (8)

in which the display processing unit performs a display process according to the execution of the process of the command.

(10)

The information processing device according to (8), in which, in a case in which there are a plurality of information recording media, the command execution processing unit executes a process of a command corresponding to the plurality of information recording media on a basis of the position information acquired by the first information acquiring unit or the second information acquiring unit.

(11)

The information processing device according to (8), in which, in a case in which a plurality of information recording media are stacked, the command execution processing unit executes a process of a command corresponding to the stacking on a basis of the position information acquired by the first information acquiring unit or the second information acquiring unit.

(12)

The information processing device according to (8), in which the command execution processing unit executes a process of a command corresponding to position information indicating a distance to the information recording medium acquired by the second information acquiring unit on a basis of the position information.

(13)

The information processing device according to (7), including a command execution processing unit configured to execute a process of a command corresponding to the identification information.

(14)

The information processing device according to (8), further including a rewrite information generating unit configured to generate rewrite information for rewriting information held in the information recording medium in response to the execution of the command by the command execution processing unit.

(15)

The information processing device according to (14), including a transmitting unit configured to transmit the rewrite information to the information recording medium.

(16)

The information processing device according to (3), in which the first information acquiring unit acquires position information of a finger of a user, and the display processing unit performs a display process of performing display on the display unit on a basis of the position information of the information recording medium acquired by the first information acquiring unit and the second information acquiring unit and the position information of the finger of the user.

(17)

The information processing device according to (8), including a receiving unit configured to receive manipulation information of a manipulating unit installed in the information recording medium, in which the command execution processing unit executes a process of a command corresponding to the manipulation information.

(18)

The information processing device according to (4), including a reader/writer pad that includes the plurality of reader/writers arranged in a matrix form.

(19)

The information processing device according to (18), in which the RFID tag has a card shape, and the first information acquiring unit acquires the position information of the RFID tag according to a motion of the RFID tag on the reader/writer pad.

(20)

The information processing device according to (5), in which the first information acquiring unit acquires the position information of the RFID tag on a basis of information acquired from a plurality of readers/writers configured to perform the near field wireless communication with the RFID tag on a basis of the communication with the RFID tag according to the near field wireless communication, the information processing device includes a reader/writer pad including the plurality of reader/writers arranged in matrix form, and the capacitance sensor is arranged such that the capacitance sensor is superimposed on the reader/writer pad.

(21)

The information processing device according to (6), including the information processing device includes a reader/writer pad including the plurality of reader/writers arranged in matrix form, in which the optical sensor is arranged such that the optical sensor is superimposed on the reader/writer pad.

(22)

The information processing device according to any of (1) to (21), in which the identification information acquired by the first information acquiring unit is transmitted to the external device.

(23)

The information processing device according to any of (1) to (22), in which the second information acquiring unit detects a direction of the RFID tag in addition to the position information and transmits the direction of the RFID tag to the external device together with the position information.

(24)

The information processing device according to any of (1) to (23), in which the second information acquiring unit detects a motion of the RFID tag in addition to the position information and transmits the motion of the RFID tag to the external device together with the position information.

(25)

An information processing method including:

acquiring identification information of an RFID tag on a basis of communication with the RFID tag according to near field wireless communication;

acquiring position information of the RFID tag in a method different from a method used by the first information acquiring unit; and transmitting the position information to an external device.

REFERENCE SIGNS LIST 100 information processing device
110 display unit
120 R/W pad
122 R/W
130 touch pad
160 photodiode
170a first position information acquiring unit
170b second position information acquiring unit
170c card information acquiring unit
170d command execution processing unit
170e card rewrite information generating unit
170f display processing unit
200 card
200a button

The invention claimed is:

1. An information processing device, comprising:
    a first information acquiring unit configured to acquire identification information of an RFID tag on a basis of communication with the RFID tag according to near field wireless communication;
    a second information acquiring unit configured to acquire position information of the RFID tag in a method different from a method used by the first information acquiring unit; and
    a command execution processing unit configured to execute a process of a command corresponding to the position information on a basis of the position information acquired by the first information acquiring unit or the second information acquiring unit,
    wherein the position information is transmitted to an external device,
    wherein the first information acquiring unit acquires the position information of the RFID tag on a basis of the communication with the RFID tag according to the near field wireless communication and
    wherein the first information acquiring unit, the second information acquiring unit, and the command execution processing unit are each implemented via at least one processor.

2. The information processing device according to claim 1, comprising
    a display processing unit configured to perform a display process of performing display on a display unit on a basis of the position information of the RFID tag acquired by the first information acquiring unit and the second information acquiring unit,
    wherein the display processing unit and the display unit are each implemented via at least one processor.

3. The information processing device according to claim 1,
    wherein the first information acquiring unit acquires the position information of the RFID tag on a basis of information acquired from a plurality of readers/writers performing the near field wireless communication with the RFID tag.

4. The information processing device according to claim 1,
    wherein the second information acquiring unit acquires the position information of the RFID tag on a basis of information acquired from a capacitance sensor configured to detect a position of the RFID tag.

5. The information processing device according to claim 1,
    wherein the second information acquiring unit acquires the position information of the RFID tag on a basis of information acquired from an optical sensor that detects a position of the RFID tag.

6. The information processing device according to claim 2,
    wherein the display processing unit performs a display process of performing display on a display unit on a basis of the identification information.

7. The information processing device according to claim 1, comprising
    a display processing unit configured to perform a display process of performing display on a display unit on a basis of the position information of the RFID tag acquired by the first information acquiring unit and the second information acquiring unit,
    wherein the display processing unit performs a display process according to the execution of the process of the command, and
    wherein the display processing unit and the display unit are each implemented via at least one processor.

8. The information processing device according to claim 1,
    wherein, in a case in which there are a plurality of RFID tags, the command execution processing unit executes a process of a command corresponding to the plurality of RFID tags on a basis of the position information acquired by the first information acquiring unit or the second information acquiring unit.

9. An information processing device, comprising:
    a first information acquiring unit configured to acquire identification information of an RFID tag on a basis of communication with the RFID tag according to near field wireless communication;
    a second information acquiring unit configured to acquire position information of the RFID tag in a method different from a method used by the first information acquiring unit; and
    a command execution processing unit configured to execute a process of a command corresponding to the position information on a basis of the position information acquired by the first information acquiring unit or the second information acquiring unit,
    wherein the position information is transmitted to an external device,
    wherein the first information acquiring unit acquires the position information of the RFID tag on a basis of the communication with the RFID tag according to the near field wireless communication, wherein, in a case in which a plurality of RFID tags are stacked, the command execution processing unit executes a process of a command corresponding to the stacking on a basis of the position information acquired by the first information acquiring unit or the second information acquiring unit, and wherein the first information acquiring unit, the second information acquiring unit, and the command execution processing unit are each implemented via at least one processor.

10. The information processing device according to claim 6, comprising
a command execution processing unit configured to execute a process of a command corresponding to the identification information,
wherein the command execution processing unit is implemented via at least one processor.

11. The information processing device according to claim 1, further comprising
a rewrite information generating unit configured to generate rewrite information for rewriting information held in the RFID tag in response to the execution of the command by the command execution processing unit,
wherein the rewrite information generating unit is implemented via at least one processor.

12. The information processing device according to claim 11, comprising
a transmitting unit configured to transmit the rewrite information to the RFID tag,
wherein the transmitting unit is implemented via at least one processor.

13. An information processing device, comprising:
a first information acquiring unit configured to acquire identification information of an RFID tag on a basis of communication with the RFID tag according to near field wireless communication;
a second information acquiring unit configured to acquire position information of the RFID tag in a method different from a method used by the first information acquiring unit; and
a display processing unit configured to perform a display process of performing display on a display unit on a basis of the position information of the RFID tag acquired by the first information acquiring unit and the second information acquiring unit,
wherein the position information is transmitted to an external device,
wherein the first information acquiring unit acquires position information of a finger of a user on a basis of the communication with the RFID tag according to the near field wireless communication,
wherein the display processing unit performs a display process of performing display on the display unit on a basis of the position information of the RFID tag acquired by the first information acquiring unit and the second information acquiring unit and the position information of the finger of the user, and
wherein the first information acquiring unit, the second information acquiring unit, the display processing unit, and the display unit are each implemented via at least one processor.

14. The information processing device according to claim 1, comprising
a receiving unit configured to receive manipulation information of a manipulating unit installed in the RFID tag,
wherein the command execution processing unit executes a process of a command corresponding to the manipulation information, and
wherein the receiving unit is implemented via at least one processor.

15. The information processing device according to claim 3, comprising
a reader/writer pad that includes the plurality of reader/writers arranged in a matrix form.

16. The information processing device according to claim 15,
wherein the RFID tag has a card shape, and the first information acquiring unit acquires the position information of the RFID tag according to a motion of the RFID tag on the reader/writer pad.

17. The information processing device according to claim 4,
wherein the first information acquiring unit acquires the position information of the RFID tag on a basis of information acquired from a plurality of readers/writers configured to perform the near field wireless communication with the RFID tag on a basis of the communication with the RFID tag according to the near field wireless communication,
the information processing device comprises a reader/writer pad including the plurality of reader/writers arranged in matrix form, and
the capacitance sensor is arranged such that the capacitance sensor is superimposed on the reader/writer pad.

18. The information processing device according to claim 5,
wherein the first information acquiring unit acquires the position information of the RFID tag on a basis of information acquired from a plurality of readers/writers configured to perform the near field wireless communication with the RFID tag on a basis of the communication with the RFID tag according to the near field wireless communication,
the information processing device comprises a reader/writer pad including the plurality of reader/writers arranged in matrix form, and
the optical sensor is arranged such that the optical sensor is superimposed on the reader/writer pad.

19. The information processing device according to claim 1,
wherein the identification information acquired by the first information acquiring unit is transmitted to the external device.

20. An information processing device, comprising:
a first information acquiring unit configured to acquire identification information of an RFID tag on a basis of communication with the RFID tag according to near field wireless communication; and
a second information acquiring unit configured to acquire position information of the RFID tag in a method different from a method used by the first information acquiring unit,
wherein the position information is transmitted to an external device,
wherein the second information acquiring unit detects a direction of the RFID tag in addition to the position information and transmits the direction of the RFID tag to the external device together with the position information, and
wherein the first information acquiring unit and the second information acquiring unit are each implemented via at least one processor.

21. An information processing device, comprising:
a first information acquiring unit configured to acquire identification information of an RFID tag on a basis of communication with the RFID tag according to near field wireless communication; and
a second information acquiring unit configured to acquire position information of the RFID tag in a method different from a method used by the first information acquiring unit,
wherein the position information is transmitted to an external device,
wherein the second information acquiring unit detects a motion of the RFID tag in addition to the position information and transmits the motion of the RFID tag to the external device together with the position information, and
wherein the first information acquiring unit and the second information acquiring unit are each implemented via at least one processor.

22. An information processing method comprising:
acquiring identification information of an RFID tag on a basis of communication with the RFID tag according to near field wireless communication;
acquiring position information of the RFID tag in a method different from a method used when acquiring the identification of the RFID tag on the basis of communication with the RFID tag according to near field wireless communication;
executing a process of a command corresponding to the position information on a basis of the acquired position information; and
transmitting the position information to an external device,
wherein the position information of the RFID tag is acquired on a basis of the communication with the RFID tag according to the near field wireless communication.

* * * * *